US012628016B2

(12) United States Patent
Krishnan et al.

(10) Patent No.: US 12,628,016 B2
(45) Date of Patent: May 12, 2026

(54) PARAMETER REPORTING TECHNIQUES FOR REDUCED CAPABILITY USER EQUIPMENT

(71) Applicant: QUALCOMM Incorporated, San Diego, CA (US)

(72) Inventors: Shankar Krishnan, San Diego, CA (US); Linhai He, San Diego, CA (US); Xipeng Zhu, San Diego, CA (US); Gavin Bernard Horn, La Jolla, CA (US); Ozcan Ozturk, San Diego, CA (US); Miguel Griot, La Jolla, CA (US); Rajeev Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 17/502,765

(22) Filed: Oct. 15, 2021

(65) Prior Publication Data

US 2023/0120574 A1 Apr. 20, 2023

(51) Int. Cl.
| | |
|---|---|
| *H04W 24/10* | (2009.01) |
| *H04B 10/079* | (2013.01) |
| *H04L 41/0896* | (2022.01) |
| *H04W 72/02* | (2009.01) |
| *H04W 74/08* | (2009.01) |

(52) U.S. Cl.
CPC .......... *H04W 24/10* (2013.01); *H04B 10/079* (2013.01); *H04L 41/0896* (2013.01); *H04W 72/02* (2013.01); *H04W 74/08* (2013.01)

(58) Field of Classification Search
CPC ....... H04W 8/24; H04W 24/10; H04W 72/02;

H04W 74/08; H04L 5/14; H04L 12/2623; H04L 12/2626; H04L 12/5875; H04L 41/0896; H04B 10/079; H04B 7/061;
(Continued)

(56) References Cited

U.S. PATENT DOCUMENTS 9,496,973 B2 11/2016 Yiu et al.
9,660,710 B2 5/2017 Chou et al.
(Continued)

OTHER PUBLICATIONS

R1-2005238, "Identification and access restriction for RedCap", Aug. 17-Aug. 28, 2020, pp. 1-4 (Year: 2020).*
(Continued)

*Primary Examiner* — Salvador E Rivas
(74) *Attorney, Agent, or Firm* — Holland & Hart LLP

(57) ABSTRACT

Methods, systems, and devices for wireless communications are described for capability indications by a reduced capability user equipment (UE) and UE-based performance measurement parameter reporting or self-organizing network (SON) parameter reporting based on the capability indications. A reduced capability UE may transmit a set of capabilities to a base station that indicate various types of parameter reporting that are supported at the UE. The base station may identify the UE as a reduced capability device, and set one or more reporting parameters based on the indicated UE capabilities. The base station may provide a reporting configuration to the UE with the one or more reporting parameters, and the UE may provide reporting of measured parameters (e.g., performance measurement parameter reporting or SON parameter reporting) based on the reporting configuration.

33 Claims, 16 Drawing Sheets

(58) Field of Classification Search

CPC ................ H04B 7/0619; H04B 7/2612; H03K
2217/9089; H04M 2207/18

See application file for complete search history.

(56) References Cited

U.S. PATENT DOCUMENTS

| | | | | |
|---|---|---|---|---|
| 11,800,518 | B2 * | 10/2023 | Xu ...................... H04W 72/535 |
| 11,811,863 | B2 * | 11/2023 | Shariat ................ H04L 67/1034 |
| 11,818,712 | B2 * | 11/2023 | Grossmann ........... H04L 5/0053 |
| 2013/0235738 | A1 * | 9/2013 | Siomina ............ H04W 72/1263 370/252 |
| 2013/0308481 | A1 * | 11/2013 | Kazmi .................. H04W 24/02 370/252 |
| 2015/0195730 | A1 * | 7/2015 | Siomina ................ H04W 24/10 370/252 |
| 2015/0201326 | A1 * | 7/2015 | Kazmi ................... H04W 8/24 370/329 |
| 2016/0192339 | A1 * | 6/2016 | Axmon ................ H04W 24/10 370/329 |
| 2017/0171786 | A1 | 6/2017 | Mochizuki et al. |
| 2018/0183562 | A1 * | 6/2018 | Yiu ...................... H04L 5/0053 |
| 2019/0052414 | A1 | 2/2019 | Babaei et al. |
| 2021/0022061 | A1 * | 1/2021 | Chou .................... H04W 36/22 |
| 2021/0195451 | A1 * | 6/2021 | Da Silva ........... H04W 36/0085 |
| 2021/0195654 | A1 | 6/2021 | Lei et al. |
| 2021/0307073 | A1 * | 9/2021 | Huang .............. H04W 74/0833 |
| 2022/0045736 | A1 * | 2/2022 | Hu .................... H04W 72/0446 |
| 2022/0086824 | A1 | 3/2022 | Kundu et al. |
| 2022/0158920 | A1 * | 5/2022 | Oyman .............. H04L 43/0829 |
| 2022/0174721 | A1 | 6/2022 | Oviedo et al. |
| 2022/0182850 | A1 * | 6/2022 | Ramachandra ....... H04W 16/28 |
| 2022/0232523 | A1 * | 7/2022 | Lee ...................... H04L 47/125 |
| 2023/0051928 | A1 * | 2/2023 | Bae ................. H04W 74/0833 |
| 2023/0052766 | A1 * | 2/2023 | Choe ..................... H04W 76/38 |
| 2023/0092483 | A1 * | 3/2023 | Thangarasa ........... H04W 24/10 455/422.1 |
| 2023/0098840 | A1 * | 3/2023 | Choi ................. H04W 36/0085 370/331 |
| 2023/0239898 | A1 | 7/2023 | Li et al. |
| 2023/0239931 | A1 * | 7/2023 | Lee ...................... H04W 74/00 370/329 |
| 2023/0308949 | A1 * | 9/2023 | Centonza .......... H04W 28/0942 |
| 2024/0172018 | A1 * | 5/2024 | Cui ...................... H04W 24/10 |
| 2025/0007654 | A1 * | 1/2025 | Li ..................... H04W 74/0833 |

OTHER PUBLICATIONS

R1-2106846, "NR UE features for RedCap", Aug. 16-Aug. 27, 2021, pp. 1-21 (Year: 2021).*

S. Moloudi et al., "Coverage Evaluation for 5G Reduced Capability New Radio (NR-RedCap)", IEEE Access, vol. 9, pp. 45055-45067, 2021, doi: 10.1109/ACCESS.2021.3066036. (Year: 2021).*

S5-090017, "Framework for UE SON reports", Jan. 12-13, 2008, pp. 1-5 (Year: 2008).*

R1-2006287, "Discussion on Framework and Principles for Reduced Capabilty", Aug. 17-Aug. 18, 2020, pp. 1-2 (Year: 2020).*

International Search Report and Written Opinion—PCT/US2022/044017—ISA/EPO—Dec. 13, 2022 (2106223WO).

* cited by examiner 510          520          515

505

500

Communications Manager

Capability Manager

625

Receiver

610

Reporting Configuration Manager

630

620

Transmitter

615

600

Figure 13:
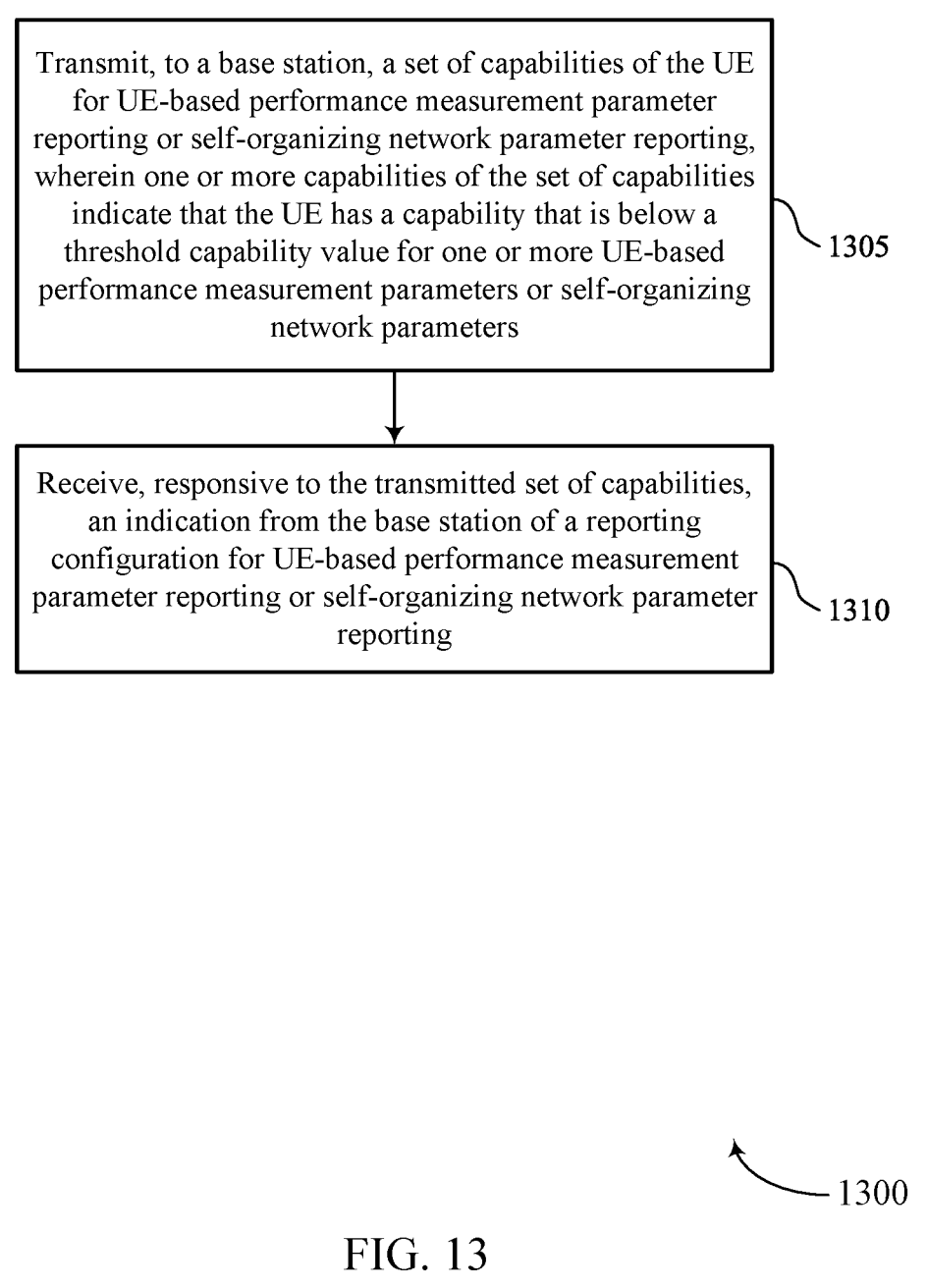

Transmit, to a base station, a set of capabilities of the UE for UE-based performance measurement parameter reporting or self-organizing network parameter reporting, wherein one or more capabilities of the set of capabilities indicate that the UE has a capability that is below a threshold capability value for one or more UE-based performance measurement parameters or self-organizing network parameters

1305

Receive, responsive to the transmitted set of capabilities, an indication from the base station of a reporting configuration for UE-based performance measurement parameter reporting or self-organizing network parameter reporting

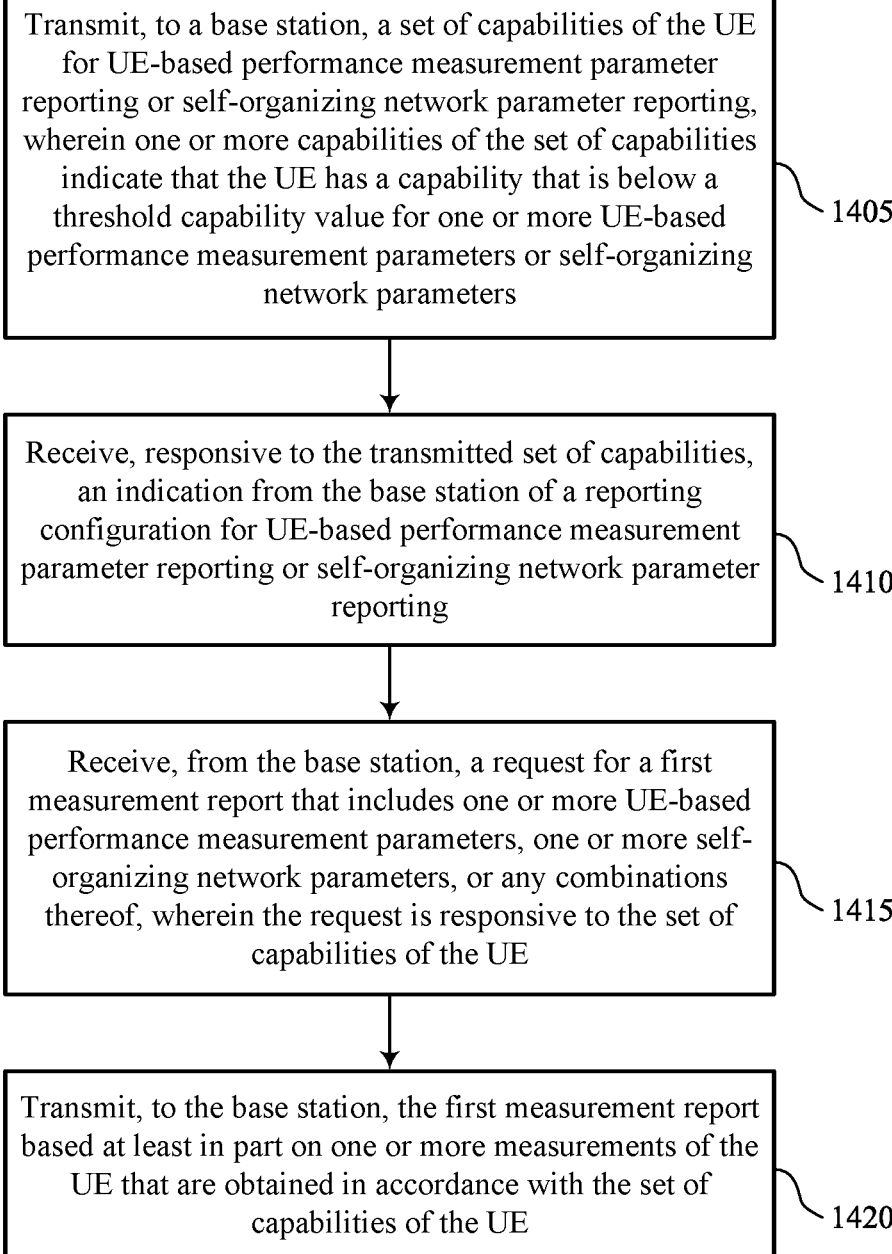

Transmit, to a base station, a set of capabilities of the UE for UE-based performance measurement parameter reporting or self-organizing network parameter reporting, wherein one or more capabilities of the set of capabilities indicate that the UE has a capability that is below a threshold capability value for one or more UE-based performance measurement parameters or self-organizing network parameters    1405

Receive, responsive to the transmitted set of capabilities, an indication from the base station of a reporting configuration for UE-based performance measurement parameter reporting or self-organizing network parameter reporting    1410

Receive, from the base station, a request for a first measurement report that includes one or more UE-based performance measurement parameters, one or more self-organizing network parameters, or any combinations thereof, wherein the request is responsive to the set of capabilities of the UE    1415

Transmit, to the base station, the first measurement report based at least in part on one or more measurements of the UE that are obtained in accordance with the set of capabilities of the UE    1420

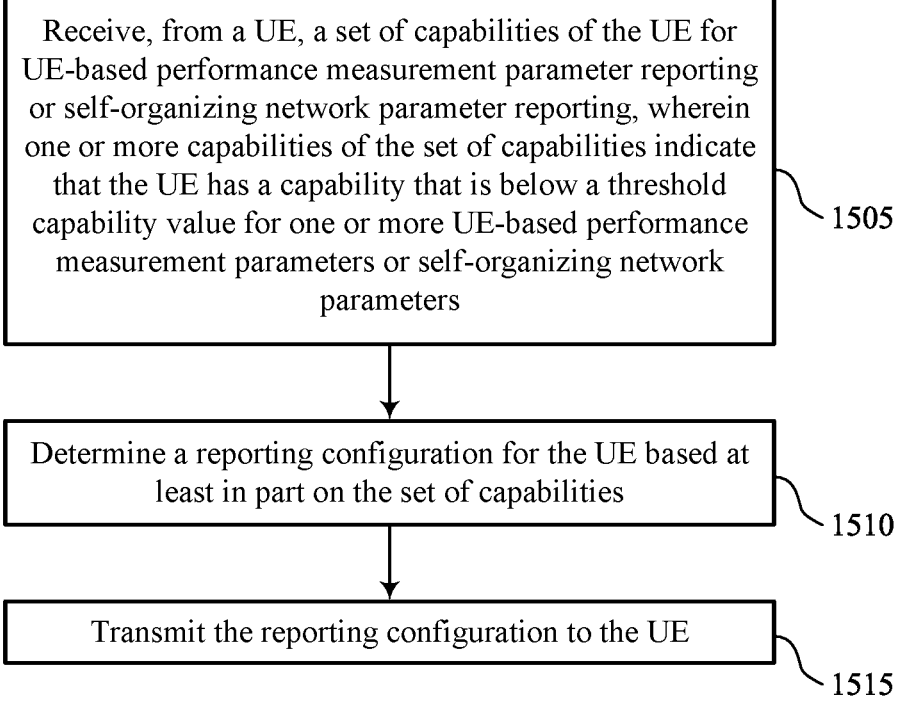

Receive, from a UE, a set of capabilities of the UE for UE-based performance measurement parameter reporting or self-organizing network parameter reporting, wherein one or more capabilities of the set of capabilities indicate that the UE has a capability that is below a threshold capability value for one or more UE-based performance measurement parameters or self-organizing network parameters

1505

Determine a reporting configuration for the UE based at least in part on the set of capabilities

1510

Transmit the reporting configuration to the UE

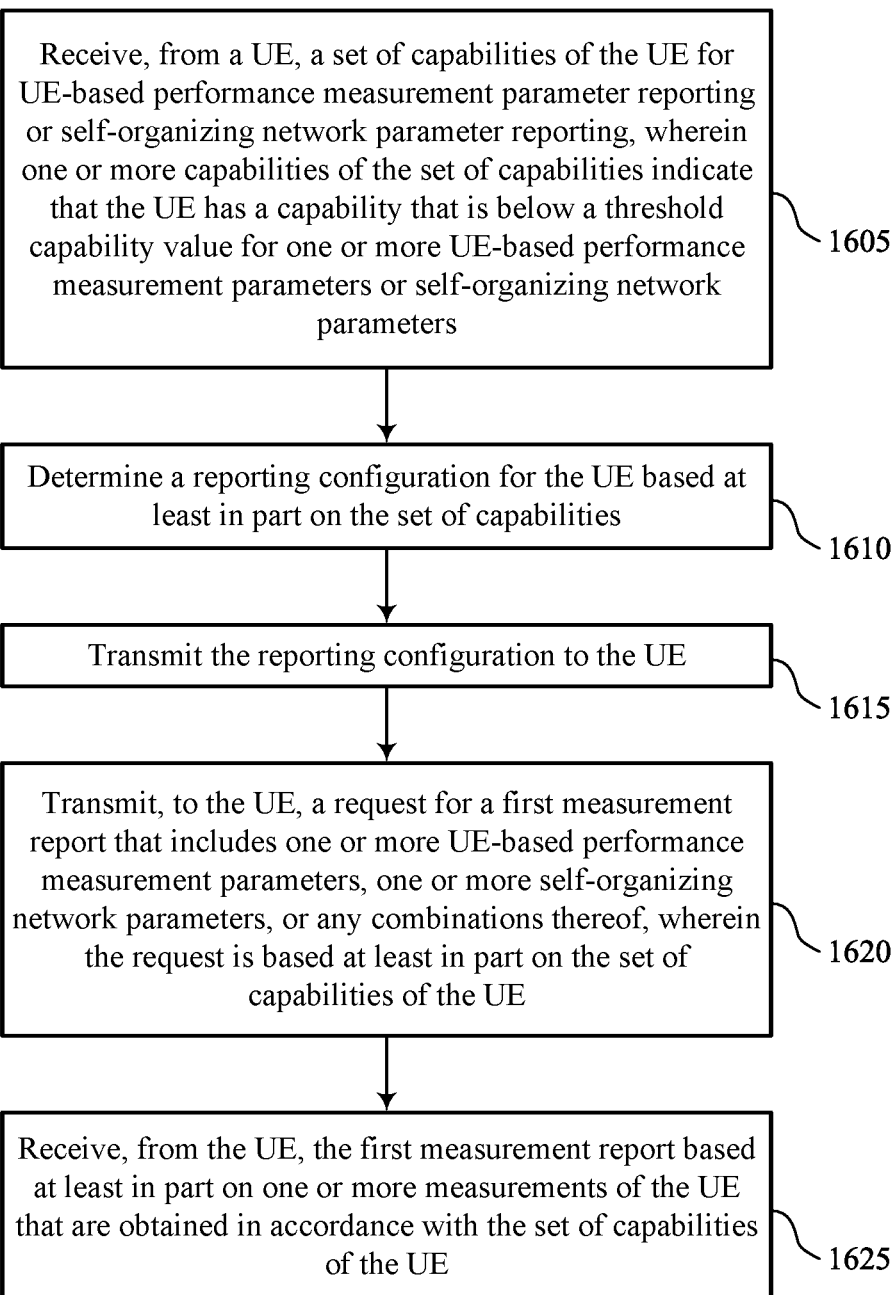

Receive, from a UE, a set of capabilities of the UE for UE-based performance measurement parameter reporting or self-organizing network parameter reporting, wherein one or more capabilities of the set of capabilities indicate that the UE has a capability that is below a threshold capability value for one or more UE-based performance measurement parameters or self-organizing network parameters ⟍ 1605

Determine a reporting configuration for the UE based at least in part on the set of capabilities ⟍ 1610

Transmit the reporting configuration to the UE ⟍ 1615

Transmit, to the UE, a request for a first measurement report that includes one or more UE-based performance measurement parameters, one or more self-organizing network parameters, or any combinations thereof, wherein the request is based at least in part on the set of capabilities of the UE ⟍ 1620

Receive, from the UE, the first measurement report based at least in part on one or more measurements of the UE that are obtained in accordance with the set of capabilities of the UE ⟍ 1625

PARAMETER REPORTING TECHNIQUES FOR REDUCED CAPABILITY USER EQUIPMENT

FIELD OF TECHNOLOGY

The following relates to wireless communications, including parameter reporting techniques for reduced capability user equipment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support parameter reporting techniques for reduced capability user equipment. In various aspects, described techniques provide for a user equipment (UE) that may have reduced capabilities relative to one or more other UEs, and such UEs having reduced capabilities may be referred to as reduced capability or RedCap devices. In some cases, a reduced capability UE (or other device) may transmit a set of capabilities to a base station, that indicate capabilities for UE-based performance measurement parameter reporting or self-organizing network (SON) parameter reporting. In some cases, one or more capabilities of the set of capabilities indicate that the UE is a reduced capability device (e.g., has a capability that is below a threshold capability value for one or more UE-based performance measurement parameters or self-organizing network parameters). The base station may identify the UE as a reduced capability device, and set one or more reporting parameters based on the indicated UE capability. The base station may provide a reporting configuration to the UE with the one or more reporting parameters, and the UE may provide reporting of measured parameters (e.g., performance measurement parameter reporting or SON parameter reporting) based on the reporting configuration.

A method for wireless communication at a user equipment (UE) is described. The method may include transmitting, to a base station, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters and receiving, responsive to the transmitted set of capabilities, an indication from the base station of a reporting configuration for the UE-based performance measurement parameter reporting or the self-organizing network parameter reporting.

An apparatus for wireless communication at a UE is described. The apparatus may include at least one processor, and memory coupled (e.g., operatively, communicatively, functionally, electronically, or electrically) with the at least one processor, the memory storing instructions executable by the at least one processor to cause the UE to transmit, to a base station, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters and receive, responsive to the transmitted set of capabilities, an indication from the base station of a reporting configuration for the UE-based performance measurement parameter reporting or the self-organizing network parameter reporting.

Another apparatus for wireless communication at a UE is described. The apparatus may include means for transmitting, to a base station, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters and means for receiving, responsive to the transmitted set of capabilities, an indication from the base station of a reporting configuration for the UE-based performance measurement parameter reporting or the self-organizing network parameter reporting.

A non-transitory computer-readable medium storing code for wireless communication at a UE is described. The code may include instructions executable by at least one processor to transmit, to a base station, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters and receive, responsive to the transmitted set of capabilities, an indication from the base station of a reporting configuration for UE-based performance measurement parameter reporting or self-organizing network parameter reporting.

Some examples of the method, apparatuses, and non-transitory computer-readable medium described herein may further include operations, features, means, or instructions for receiving, from the base station, a request for a first measurement report that includes the one or more UE-based performance measurement parameters, the one or more self-organizing network parameters, or any combinations thereof, where the request is responsive to the set of capabilities of the UE, and transmitting, to the base station, the first measurement report based on one or more measurements of the UE that are obtained in accordance with the set of capabilities of the UE. In some examples of the method, apparatuses, and non-transitory computer-readable medium described herein, the set of capabilities of the UE include one or more of an explicit UE capability for transmitting a radio link failure (RLF) report, a connection establishment failure (CEF) report, a mobility history report (MHR), a cross-radio access technology (cross-RAT) RLF report, an RLF report for inter-RAT mobility robustness optimization (MRO), or any combinations thereof. In some examples of the method, apparatuses, and non-transitory computer-readable medium described herein, the set of capabilities of the UE include a separate capability indication that the UE lacks support for self-organizing network (SON) or minimization of drive tests (MDT) parameter reporting.

In some examples of the method, apparatuses, and non-transitory computer-readable medium described herein, the set of capabilities of the UE indicate that the UE is a reduced capability (redcap) UE, and indicate that the base station is to request only a supported SON report or MDT report that is based on the set of capabilities of the UE. In some examples of the method, apparatuses, and non-transitory computer-readable medium described herein, the one or more capabilities indicate a number of parameters that the UE has a capability to report in a UE-based performance measurement parameter report or a self-organizing network parameter report. In some examples of the method, apparatuses, and non-transitory computer-readable medium described herein, the number of parameters that the UE has the capability to report is indicated by a scaling factor relative to an unscaled number of parameters that are reported by non-reduced capability devices.

In some examples of the method, apparatuses, and non-transitory computer-readable medium described herein, the number of parameters that the UE has the capability to report includes a number of neighboring cell measurements that are storable at the UE for a logged MDT procedure. In some examples of the method, apparatuses, and non-transitory computer-readable medium described herein, the number of parameters that the UE has the capability to report includes a number of random access channel (RACH) procedure parameters that are included in a RACH report. In some examples of the method, apparatuses, and non-transitory computer-readable medium described herein, the number of parameters that the UE has the capability to report is indicated by a memory size of the UE for storing logged MDT measurements.

In some examples of the method, apparatuses, and non-transitory computer-readable medium described herein, the UE may be a reduced capability device and the reporting configuration includes a maximum value of a measurement logging interval that is based on a discontinuous reception (DRX) cycle time of the UE and a logging duration of the UE and the DRX cycle time and the logging duration is increased relative to a non-reduced capability device. In some examples of the method, apparatuses, and non-transitory computer-readable medium described herein, the reporting configuration includes a report storage duration that is based on the UE being a reduced capability device. In some examples of the method, apparatuses, and non-transitory computer-readable medium described herein, the reporting configuration includes one or more event triggers for measuring and storing one or more measurement parameters, the one or more event triggers based on the UE being a reduced capability device.

A method for wireless communication at a base station is described. The method may include receiving, from a UE, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters, determining a reporting configuration for the UE based on the set of capabilities, and transmitting the reporting configuration to the UE.

An apparatus for wireless communication at a base station is described. The apparatus may include at least one processor, and memory coupled (e.g., operatively, communicatively, functionally, electronically, or electrically) with the at least one processor, the memory storing instructions executable by the at least one processor to cause the base station to receive, from a UE, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters, determine a reporting configuration for the UE based on the set of capabilities, and transmit the reporting configuration to the UE.

Another apparatus for wireless communication at a base station is described. The apparatus may include means for receiving, from a UE, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters, means for determining a reporting configuration for the UE based on the set of capabilities, and means for transmitting the reporting configuration to the UE.

A non-transitory computer-readable medium storing code for wireless communication at a base station is described. The code may include instructions executable by at least one processor to receive, from a UE, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters, determine a reporting configuration for the UE based on the set of capabilities, and transmit the reporting configuration to the UE.

Some examples of the method, apparatuses, and non-transitory computer-readable medium described herein may further include operations, features, means, or instructions for transmitting, to the UE, a request for a first measurement report that includes the one or more UE-based performance measurement parameters, the one or more self-organizing network parameters, or any combinations thereof, where the request is based on the set of capabilities of the UE, and receiving, from the UE, the first measurement report based on one or more measurements of the UE that are obtained in accordance with the set of capabilities of the UE. In some examples of the method, apparatuses, and non-transitory computer-readable medium described herein, the set of capabilities of the UE include one or more of an explicit UE capability for transmitting a RLF report, a CEF report, a MHR, a cross-RAT RLF report, an RLF report for inter-RAT MRO, or any combinations thereof. In some examples of the method, apparatuses, and non-transitory computer-readable medium described herein, the set of capabilities of the UE include a separate capability indication that the UE lacks support for SON or MDT parameter reporting.

5

In some examples of the method, apparatuses, and non-transitory computer-readable medium described herein, the set of capabilities of the UE indicate that the UE is a reduced capability (redcap) UE, and indicate that the base station is to request only a supported SON report or MDT report that is based on the set of capabilities of the UE. In some examples of the method, apparatuses, and non-transitory computer-readable medium described herein, the one or more capabilities indicate a number of parameters that the UE has a capability to report in a UE-based performance measurement parameter report or a self-organizing network parameter report. In some examples of the method, apparatuses, and non-transitory computer-readable medium described herein, the number of parameters that the UE has the capability to report is indicated by a scaling factor relative to an unscaled number of parameters that are reported by a non-reduced capability device. In some examples of the method, apparatuses, and non-transitory computer-readable medium described herein, the UE may be a reduced capability device and the reporting configuration includes a maximum value of a measurement logging interval that is based on a DRX cycle time of the UE and a logging duration of the UE and the DRX cycle time and the logging duration are increased relative to a non-reduced capability device.

6

Figure 12:
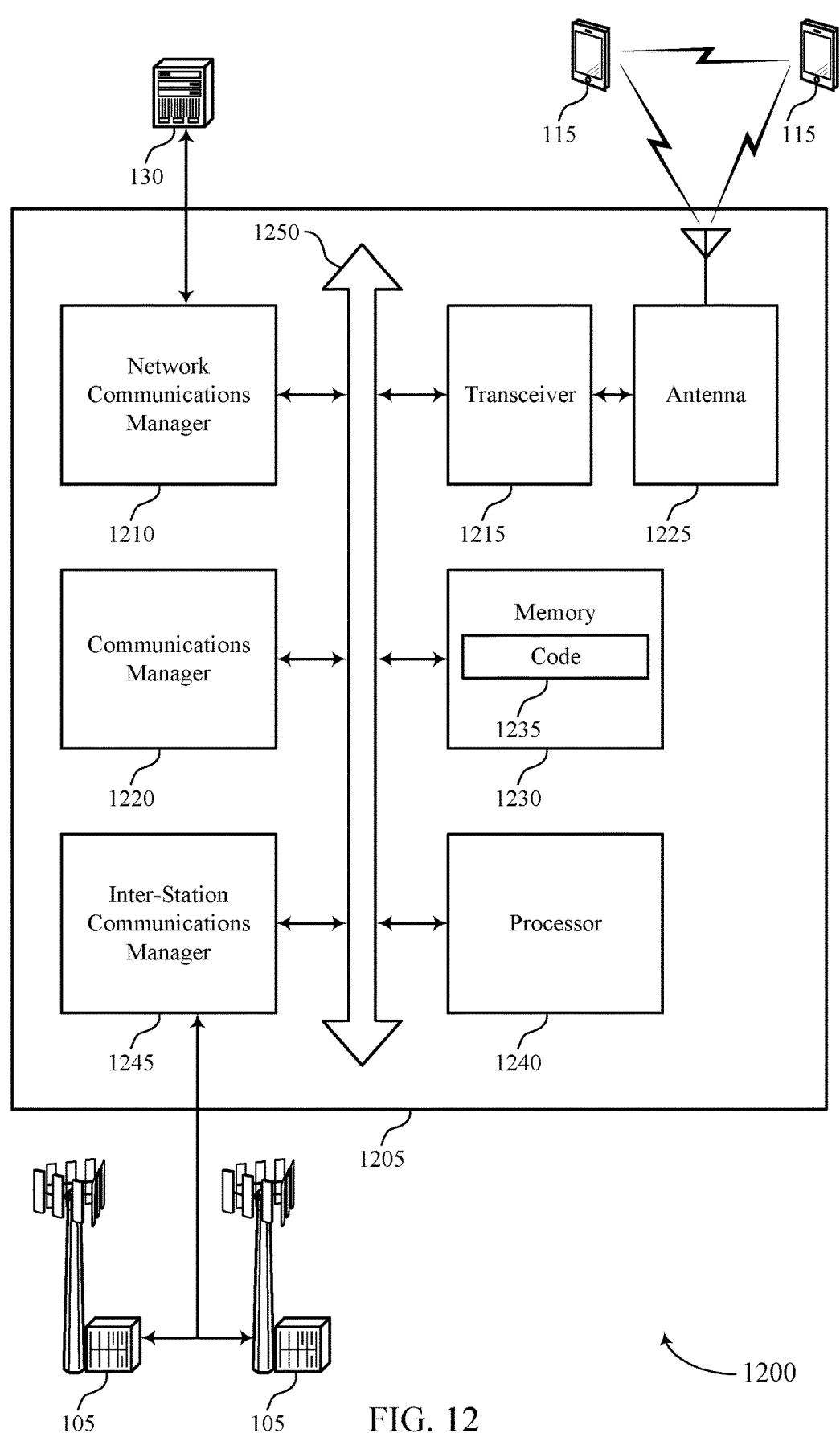

FIG. 12 shows a diagram of a system including a device that supports parameter reporting techniques for reduced capability user equipment in accordance with aspects of the present disclosure.

FIGS. 13 through 16 show flowcharts illustrating methods that support parameter reporting techniques for reduced capability user equipment in accordance with aspects of the present disclosure.

DETAILED DESCRIPTION

In accordance with aspects of the present disclosure, a user equipment (UE) may be configured to report self-organizing network (SON) or minimization of drive test (MDT) data to a base station or other network entity in a wireless communications system. The base station may use the SON or MDT data reported by the UE to set or adjust various communications parameters with the UE and other UEs that are served by the base station, with the adjustments helping to improve the likelihood of successful communications between the base station and served UEs. For example, the base station may adjust one or more network configuration parameters (e.g., transmission parameters, resource allocations, modulation schemes) to improve the likelihood that subsequent communications between the base station and UEs are successful. In some examples, the base station may configure the UE with a set of SON or MDT reporting criteria, and the UE may generate (e.g., log, record) information related to measured parameters in accordance with the set of SON or MDT reporting criteria. For example, the UE may generate a SON or MDT report that includes various information elements (IEs) related to one or more configured measurements, and may transmit the SON or MDT report to the base station in accordance with the set of SON or MDT reporting criteria.

In some cases, a UE may be a reduced capability device relative to other devices. For example, some UEs may support a reduced operating bandwidth to reduce power consumption and UE complexity, which may allow for lower cost devices that have simpler hardware with less processing resources and less memory. In some cases, a reduced operating bandwidth may include, for example, a bandwidth of less than 20 MHz, or less than 100 resource blocks. However, existing procedures for MDT and SON reporting may configure UEs to measure parameters for a number of neighboring base stations, Wi-Fi access points, Bluetooth transmitters, UE orientation/speed/location information, packet delays, and/or radio link failures, without regard to UE capability. In some cases, a reduced capability UE (also referred to as a RedCap UE or skinny UE) that may not have capabilities to perform various MDT/SON procedures, or may have capabilities to perform fewer of such procedures than a non-reduced capacity UE. Various aspects discussed herein may be used to provide for a UE capability report to indicate reduced capabilities for MDT/SON procedures, and for UE reporting of measured parameters based on the indicated capabilities.

In some cases, capability signaling and procedures are provided that allow a reduced capability UE to indicate to a base station its MDT/SON capabilities and perform MDT/SON parameter measurements according to the reduced capabilities. The capability signaling may provide capability indications for a UE to indicate a level of MDT/SON measurements that may be supported by the UE, for example. The base station may configure measurement reports for the UE based on the capability signaling, such that reduced numbers of parameters are reported. In some cases, a UE may indicate that it has no capability for MDT/SON reporting, and in such cases the base station may not configure such measurement reports. In some cases, the capability signaling may include one or more additional capability indications than are available using existing techniques, such as a capability indication of whether radio link failure (RLF) or connection establishment failure (CEF) reports are supported by the UE. In some cases, capability indications may be provided for one or more parameters that are optional features in existing techniques, such as a mobility history and certain RLF reports. In some cases, the UE capability may provide an indication of relaxed or reduced UE capability for certain measurements, which may be indicated by a scaling factor for a number of measurements that can be reported in some examples.

Aspects of the present disclosure may be implemented to realize one or more advantages. For example, the described techniques may provide for using SON or MDT data from reduced capability devices to improve the reliability of communications at one or more base stations of a wireless communications network. The base station may receive the SON or MDT report, and may adjust one or more network configuration parameters (e.g., RACH parameters, resource allocations, transmission parameters, modulation schemes) to improve the likelihood of subsequent communications being successfully received at a receiving device. Further, in some cases the base station may alter data rates based on the SON or MDT report to provide data rates that are suited to the measurements reported in SON or MDT reports, which may help to enhance overall network efficiency, latency, and reliability.

Aspects of the disclosure are initially described in the context of wireless communications systems and process flows. Aspects of the disclosure are further illustrated by and described with reference to apparatus diagrams, system diagrams, and flowcharts that relate to parameter reporting techniques for reduced capability user equipment.

Figure 1:
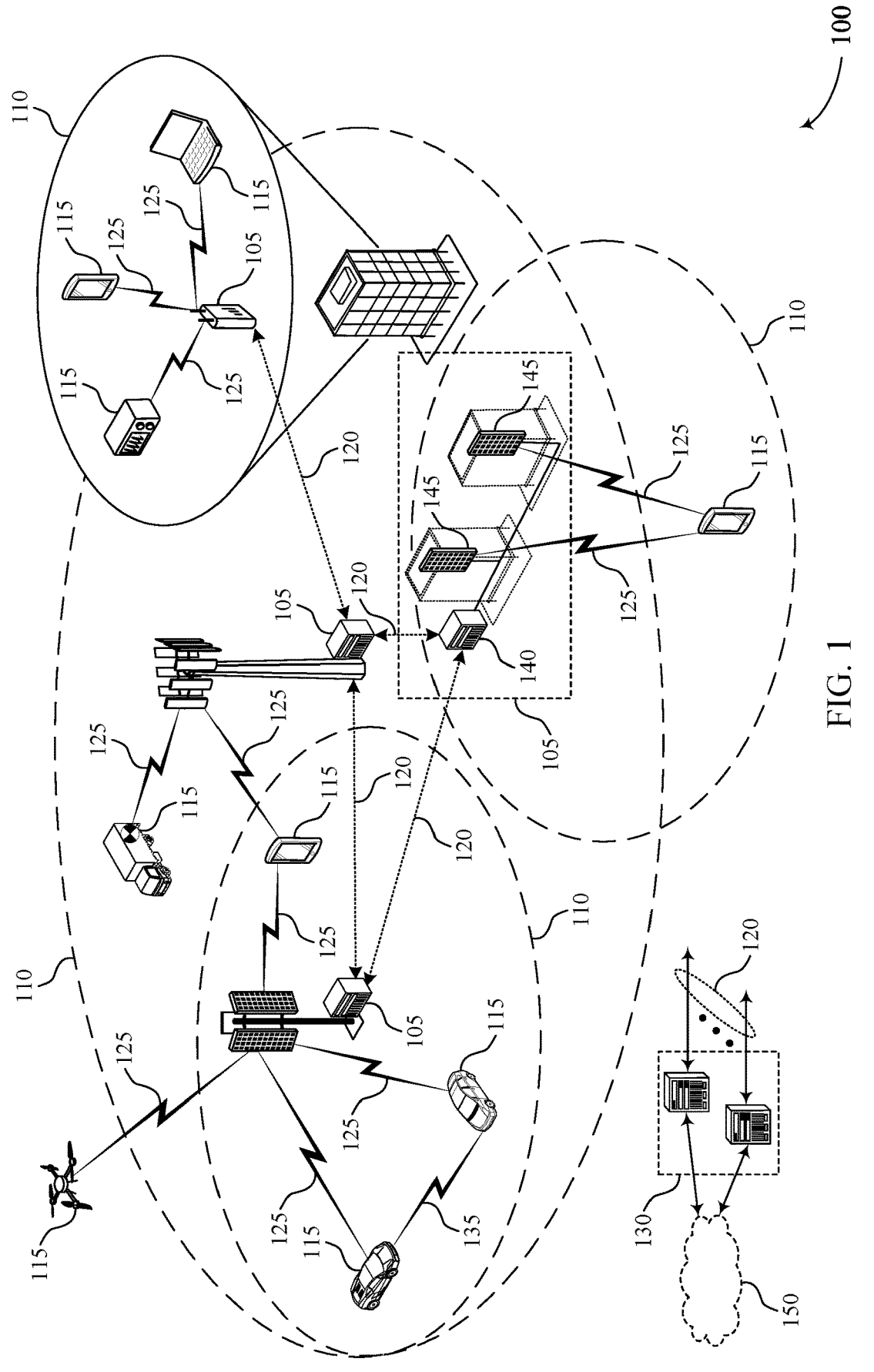
FIG. 1 illustrates an example of a wireless communications system that supports parameter reporting techniques for reduced capability user equipment in accordance with aspects of the present disclosure.

FIG. 1 illustrates an example of a wireless communications system 100 that supports parameter reporting techniques for reduced capability user equipment in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, or the like, which may be implemented in various articles such as appliances, drones, robots, vehicles, or meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 (e.g., RedCap UEs) may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, one or more of the UEs 115 may be reduced capability devices that may have reduced capabilities relative to one or more other UEs 115. In some cases, a reduced capability UE 115 may transmit a set of capabilities to a base station 105, that indicate capabilities for UE-based performance measurement parameter reporting (e.g., MDT reporting) or SON parameter reporting. In some cases, one or more capabilities of the set of capabilities indicate that the UE 115 is a reduced capability device (e.g., has a capability that is below a threshold capability value for one or more UE-based performance measurement parameters or SON parameters). The base station 105 may identify the UE 115 as a reduced capability device, and set one or more reporting parameters based on the indicated UE capability. The base station 105 may provide a reporting configuration to the UE 115 with the one or more reporting parameters, and the UE 115 may provide reporting of measured parameters (e.g., MDT reporting, SON parameter reporting, or both) based on the reporting configuration.

Figure 2:
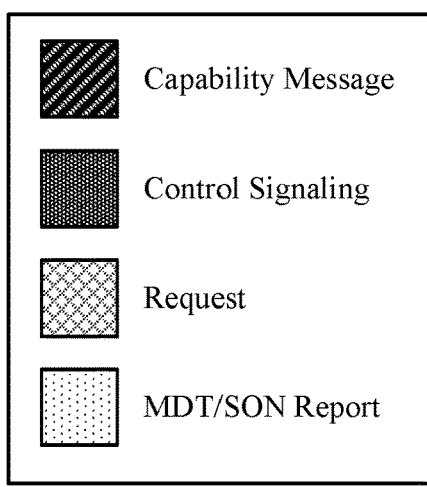
FIG. 2 illustrates an example of a portion of a wireless communications system that supports parameter reporting techniques for reduced capability user equipment in accordance with aspects of the present disclosure.
Figure 2:
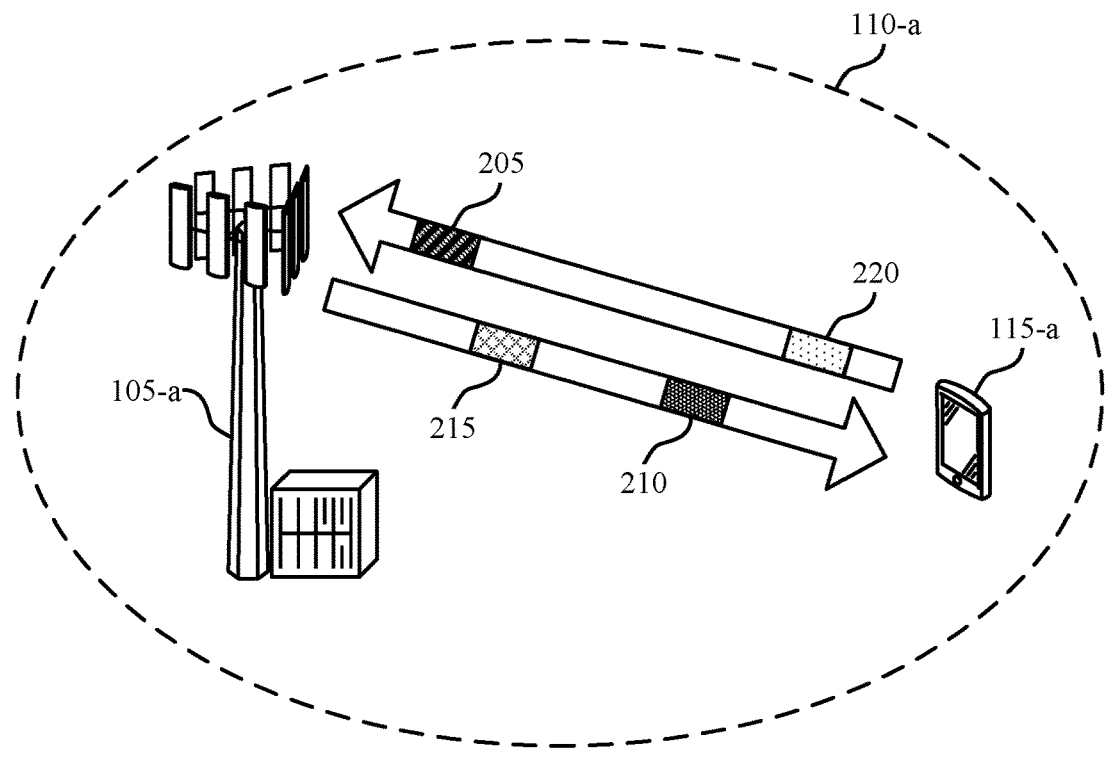

FIG. 2 illustrates an example of a wireless communications system 200 that supports parameter reporting techniques for reduced capability user equipment in accordance with aspects of the present disclosure. The wireless communications system 200 may implement or be implemented by aspects of wireless communications system 100. For example, the wireless communications system 200 may include a UE 115-a and a base station 105-a, which may be examples of corresponding devices described with reference to FIG. 1. The base station 105-a may be associated with a geographic coverage area 110-a, which may be an example of a geographic coverage area 110 described with reference to FIG. 1.

In accordance with aspects of the present disclosure, the UE 115-a may transmit an capability message 205 to the base station 105-a. In some cases, the capability message 205 may include a set of capabilities of the UE 115-a for UE-based performance measurement parameter reporting (e.g., MDT reporting) or SON parameter reporting. In some cases, the UE 115-a may be a reduced capability device, and one or more capabilities of the set of capabilities indicate that the UE 115-a is a reduced capability device (e.g., the capability message 205 may indicate that the UE 115-a has a capability that is below a threshold capability value for one or more UE-based performance measurement parameters or SON parameters). The base station 105-a may receive the capability message 205 and determine one or more reporting parameters for the UE 115-a. The base station 105-a may transmit control signaling 210 that indicates a reporting configuration for MDT/SON parameter reporting. In some cases, the base station 105-a may transmit a request 215 for a MDT/SON report, and the UE 115-a may transmit a MDT/SON report 220 responsive to the request 215. The base station 105-a may use the MDT/SON report 220 to improve the likelihood of successful communications (e.g., by adjusting resource allocations, adjusting transmission parameters, adjusting RACH parameters, or any combinations thereof).

In some cases, the set of capabilities may include one or more MDT/SON capabilities, such as whether the UE 115-a supports reporting of one or more of a RACH report, uncompensated barometric pressure measurements, Bluetooth measurements in connected state (e.g., in RRC_CONNECTED), Bluetooth measurements in idle or inactive state (e.g., RRC_IDLE and RRC_INACTIVE), logged measurements (e.g., periodical logging and/or event-triggered logging) in idle and inactive state, WLAN measurements in connected state, WLAN measurements in idle and inactive state, orientation information, speed information, detailed location information, or uplink packet average delay measurements. Further, in some cases, the set of capabilities may include an indication of whether the UE 115-a supports delivery of one or more of a RLF report, a CEF report, a mobility history report, a cross-RAT RLF report, or an RLF report for inter-RAT mobility robustness optimization (MRO). Further, in some cases, the capability message 205 may indicate that the UE 115-a does not support any MDT/SON reporting (e.g., one of the capabilities of the set of capabilities may indicate MDT/SON reporting is not supported at the UE 115-a).

In some cases, additionally or alternatively, the base station 105-a may not request reporting from the UE 115-a for MDT/SON features that do not have an explicit indication of support. For example, the set of capabilities may not include a capability indication for RLF and CEF reporting, and in such cases the base station 105-a may not request such reporting from a reduced capability device such as UE 115-a. In other examples, the set of capabilities may not include a capability indication for certain optional MDT/SON features, such as mobility history reporting, cross-RAT RLF reporting, or RLF reporting for inter-RAT MRO, and in such cases the base station 105-a may not request such reporting from a reduced capability device such as UE 115-a.

In some further aspects, the capability message 205 may indicate a number of parameters that the UE 115-a has a capability to report. As discussed, in some cases reduced capability devices such as UE 115-a may have lower hardware complexity than non-reduced capability devices (also referred to as full-capability devices), and may as a result have reduced processing capability, reduced storage, or combinations thereof, relative to full-capability devices. In some cases, based on the reduced hardware configuration, the UE 115-a may be able to support some MDT/SON reporting but provide less reporting information than a full-capability device. Various examples of such reduced reporting are discussed with reference to FIG. 3.

Figure 3:
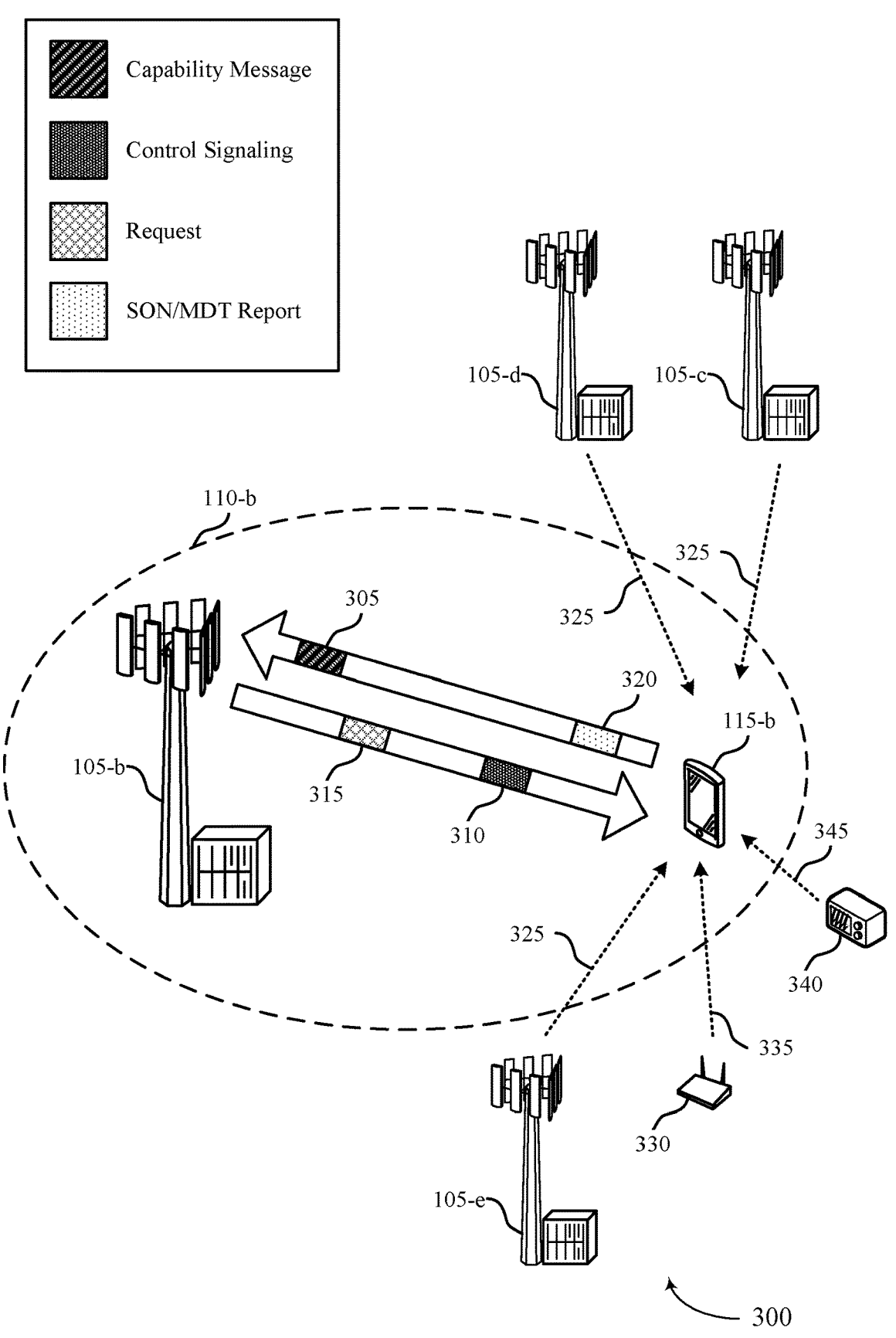
FIG. 3 illustrates an example of a wireless communications system that supports parameter reporting techniques for reduced capability user equipment in accordance with aspects of the present disclosure.

FIG. 3 illustrates an example of a wireless communications system 300 that supports parameter reporting techniques for reduced capability user equipment in accordance with aspects of the present disclosure. The wireless communications system 300 may implement or be implemented by aspects of wireless communications system 100 or 200. For example, the wireless communications system 300 may include a UE 115 b, a serving base station 105 b, and neighboring base stations 105-c, 105-d, 105-e, which may be examples of corresponding devices described with reference to FIG. 1. The serving base station 105 b may be associated with a geographic coverage area 110 b, which may be an example of a geographic coverage area 110 described with reference to FIG. 1 or 2. In this example, a WLAN device 330 (e.g., a Wi-Fi access point) may transmit signals 335 that may be measured and reported as WLAN measurements by the UE 115-b. Further, in this example, a Bluetooth device 340 may transmit signals 345 that may be measured and reported as Bluetooth measurements by the UE 115-b.

Similarly as discussed with reference to FIG. 2, the UE 115-b may transmit a capability message 305 to the serving base station 105-b (e.g., that indicates capabilities of a set of capabilities of the UE 115-b MDT/SON reporting). In some cases, the UE 115-b may be a reduced capability device, and one or more capabilities of the set of capabilities indicate that the UE 115-b is a reduced capability device. The serving base station 105-b may receive the capability message 305 and determine one or more reporting parameters for the UE 115-b, and transmit control signaling 310 that indicates a reporting configuration for MDT/SON parameter reporting. In some cases, the serving base station 105-b may transmit a request 315 for a MDT/SON report, and the UE 115-b may transmit a MDT/SON report 320 responsive to the request 315. The serving base station 105-b may use the MDT/SON report 320 to improve the likelihood of successful communications (e.g., by adjusting resource allocations, adjusting transmission parameters, adjusting RACH parameters, or any combinations thereof).

In accordance with various aspects, the set of capabilities may indicate a number of parameters that the UE 115-*b* has a capability to report based on a reduced hardware configuration. In some cases, the capability message 205 may provide a scaling factor for one or more MDT/SON features. For example, based on a hardware configuration of the UE 115-*b*, in indication of a scaled RACH report may be provided that indicates a portion of a maximum amount of RACH records that can be reported by the UE 115-*b*. Thus, if eight RACH records may be reported in a report of a full-capability device and a scaling factor of 0.5 is indicated by the UE 115-*b*, the MDT/SON report 320 may provide four RACH records. Such reduced parameter reporting may allow for reduced memory size, while also supporting MDT/SON reporting that may help with network management to provide for efficient network efficiency.

In some examples, a reduced number of parameters may indicate a number of neighboring cells that can be reported by the UE 115-*b*. For example, measurements of signals 325 from neighboring base stations 105-*c*, 105-*d*, and 105-*e* may be logged at the UE 115-*b*, and the MDT/SON report 320 may include a reduced number of logged measurements relative to a number provided by a full-capability device. In some cases, reports may be defined that include fields for a maximum number of measurements of a full-capability device, and a scaling factor indicated by the UE 115-*b* may indicate a portion of the maximum number of measurements that are reported. For example, a logged MDT may include measurement results for up to six neighboring cells on a serving frequency, up to three cells per neighboring frequency, and up to 3 neighbors per inter-RAT frequency (e.g., that is included in a system information block such as SIBS provided to the UE 115-*b*). In such a case, to reduce complexity on the UE 115-*b*, the neighboring cell measurements for logged MDT may be relaxed by allowing a lower number of intra-frequency/inter-frequency/inter-RAT frequencies to be measured (e.g., which may be indicated by a scaling factor or an explicit number of measurement results that can be reported).

In some cases, the UE 115-*b* may provide an indication of an amount of memory available for a logged MDT (e.g., a logged MDT report can contain logs until a maximum of 64 KB, and the UE 115-*b* may indicate a memory size of logged MDT report is a maximum of 32 KB). Additionally, or alternatively, a full-capability device may use a logging interval of up to 61.44 s and a logging duration of up to 120 minutes, and a reduced-capability device may indicate values for such intervals and durations to allow for less memory usage and fewer communications from the UE 115-*b* (e.g., a maximum discontinuous reception (DRX) cycle of the UE 115-*b* may be up to 10485.76 s, and the logging interval may be increased to up to 10485.76 s or a few multiples thereof, and a logging duration may be increased such as to one day or longer). Further, in some cases, SON/MDT reports may be stored by a full-capability device for up to 48 hours, and the UE 115-*b* may have an increased duration for which the reports can be stored (e.g., up to 96 hours) to allow for a longer duration to report to the network. Additionally, in some cases, logged MDT may be stored by a full-capability device on a periodic or event triggered basis (e.g., when going out of coverage or upon meeting some conditions such as when RSRP of serving cell is below a threshold), and one or more additional event triggers may be provided for reduced-capability devices (e.g., that logged MDT needs to be stored only when a certain criteria is met, such as if the device is stationary or not at cell edge). Such techniques may allow for reduced capability devices to collect and report various parameters using the operating characteristics of the devices and using reduced complexity hardware, and also allow the serving base station 105-*b* or another network entity to use the MDT/SON report 320 to improve communications efficiency (e.g., by adjusting resource allocations, adjusting transmission parameters, adjusting RACH parameters, or any combinations thereof, based on reported MDT/SON parameters).

Figure 4:
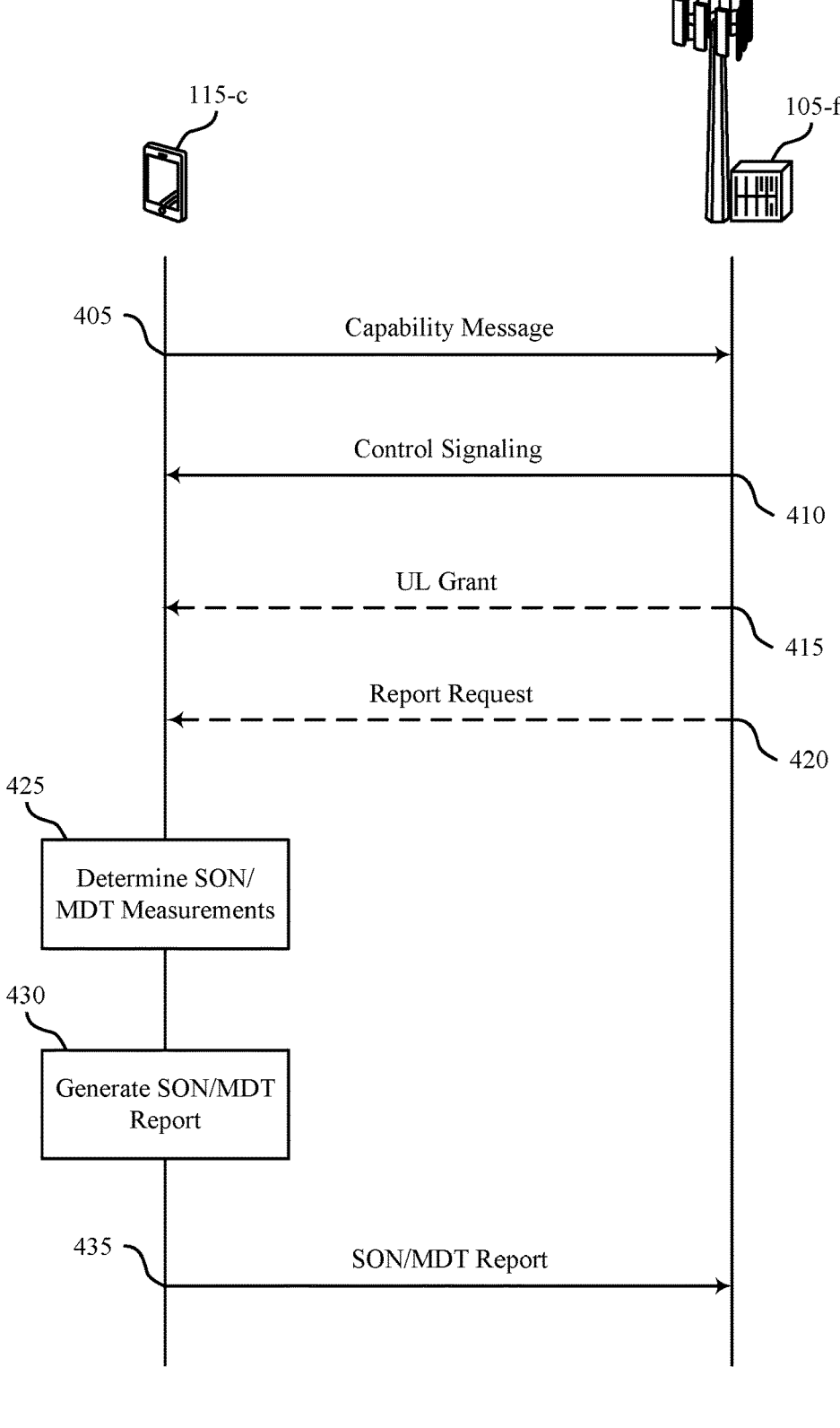
FIG. 4 illustrates an example of a process flow that supports parameter reporting techniques for reduced capability user equipment in accordance with aspects of the present disclosure.

FIG. 4 illustrates an example of a process flow 400 that supports parameter reporting techniques for reduced capability user equipment in accordance with aspects of the present disclosure. The process flow 400 may implement or be implemented by aspects of the wireless communications systems 100, 200, or 300. For example, the process flow 400 may include a UE 115-*c* and a base station 105-*f*, which may be examples of corresponding devices described with reference to FIGS. 1 through 3. In the following description of the process flow 400, operations between the UE 115-*c* and the base station 105-*f* may be performed in a different order or at a different time than as shown. Additionally or alternatively, some operations may be omitted from the process flow 400, and other operations may be added to the process flow 400. In accordance with the process flow 400, the UE 115-*c* may transmit a SON or MDT report to the base station 105-*f*, and the base station 105-*f* may adjust one or more network configuration parameters based on the SON or MDT report.

At 405, the UE 115-*c* may transmit a capability message to the base station 105-*f*. The capability message may indicate a capability of the UE 115-*c* to generate SON or MDT reports, types of parameters that may be reported, quantities of parameters that can be reported, or any combinations thereof. In some cases, the capability message may indicate set of capabilities of the UE 115-*c* for UE-based performance measurement parameter (e.g., MDT parameter) reporting or SON parameter reporting, where one or more capabilities of the set of capabilities indicate that the UE has a capability that is below a threshold capability value (e.g., a capability value of a full-capability device) for one or more UE-based performance measurement parameters or SON parameters. In some cases, the capability message may be transmitted to the base station 105-*f* in RRC signaling, in uplink control information (UCI), in a medium access control (MAC) control element (CE), or any combinations thereof.

At 410, the base station 105-*f* may transmit control signaling to the UE 115-*c*. The control signaling may indicate a set of SON or MDT reporting criteria, which the UE 115-*c* may use to generate a SON or MDT report. In some cases, the set of SON or MDT reporting criteria may be based on the capability message transmitted by the UE 115-*c*. In some cases, the control signaling may be transmitted to the UE 115-*c* in RRC signaling, in downlink control information (DCI), in a MAC-CE, or any combinations thereof. In some examples, at 415, the base station 105-*f* may transmit an uplink grant (e.g., a configured grant) for uplink resources on which to transmit the SON or MDT report. Additionally, or alternatively, at 420, the base station 105-*f* may transmit a report request for a SON or MDT report.

At 425, the UE 115-*c* may determine SON or MDT measurements based on the set of SON or MDT reporting criteria. In some cases, the SON or MDT measurements may be collected in accordance with a logged measurements configuration provided with the control signaling. In some cases, the measurements may include information for one or more of a RACH report, uncompensated barometric pressure measurements, Bluetooth measurements e.g., in connected, idle, or inactive state), logged measurements (e.g., periodical logging or event-triggered logging), WLAN measurements (e.g., in connected, idle, or inactive state), orientation information, speed information, detailed location information, or uplink packet average delay measurements, a RLF report, a CEF report, a mobility history report, a cross-RAT RLF report, an RLF report for inter-RAT MRO, or any combinations thereof.

At 430, the UE 115-*c* may generate a SON or MDT report based on the determined SON or MDT measurements. The SON or MDT report may include various fields (e.g., information elements (IEs), parameters, statistics) that include information related to the various reported measurements. At 435, the UE 115-*c* may transmit the SON/MDT report to the base station 105-*f* In some cases, The UE 115-*c* may transmit the SON/MDT report to the base station 105-*f* while the UE 115-*c* is in a connected state (e.g., RRC_CONNECTED) or an inactive state (e.g., RRC_INACTIVE) with respect to communications with the base station 105-*f*. In some examples, the UE 115-*c* may indicate an availability of the SON or MDT report to the base station 105-*f* (e.g., in various RRC messages or other uplink messages), and the base station 105-*f* may request the SON/MDT report from the UE 115-*c*. The base station 105-*f* may use the SON or MDT report to adjust one or more communications parameters (e.g., modulation and coding scheme, transmit power parameters, coverage enhancement parameters) to enhance communications efficiency and reliability, provide for RACH enhancement (e.g., provide suitable RACH parameters such as preambles, resources, radio bearers), or both. As such, configuring the UE 115-*c* to generate and transmit a SON or MDT report in accordance with aspects of the present disclosure may improve the efficiency and reliability of communications between the base station 105-*f* and the UE 115-*c*, while allowing for reporting of various parameters by reduced capability devices.

Figure 5:
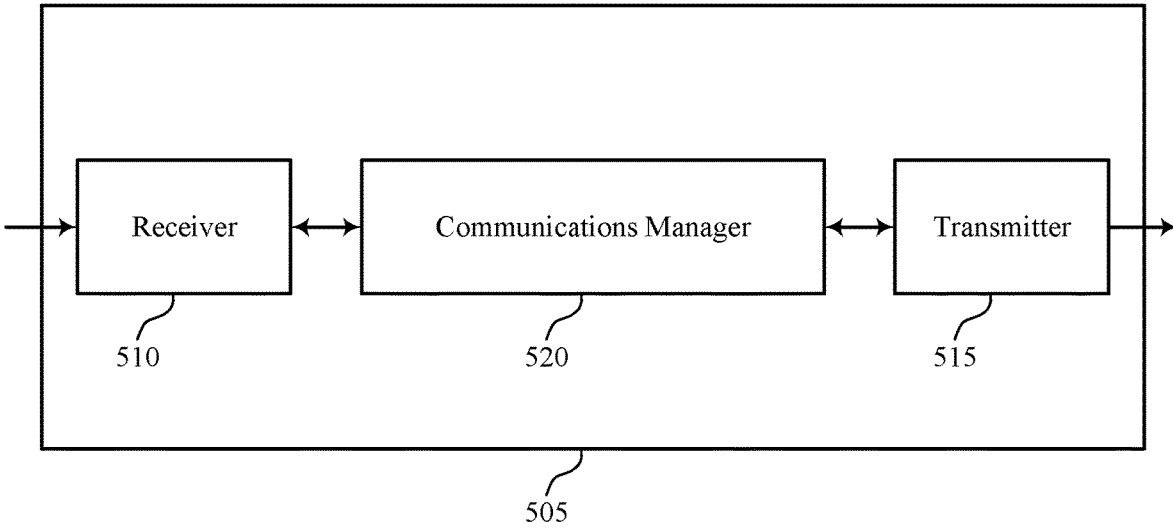
FIGS. 5 and 6 show block diagrams of devices that support parameter reporting techniques for reduced capability user equipment in accordance with aspects of the present disclosure.

FIG. 5 shows a block diagram 500 of a device 505 that supports parameter reporting techniques for reduced capability user equipment in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to parameter reporting techniques for reduced capability user equipment). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to parameter reporting techniques for reduced capability user equipment). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of parameter reporting techniques for reduced capability user equipment as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software) executed by a processor. If implemented in code executed by a processor, the functions of the communications manager 520, the receiver 510, the transmitter 515, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for transmitting, to a base station, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters. The communications manager 520 may be configured as or otherwise support a means for receiving, responsive to the transmitted set of capabilities, an indication from the base station of a reporting configuration for UE-based performance measurement parameter reporting or self-organizing network parameter reporting.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for collection and reporting of SON/MDT data from reduced capability devices to improve the reliability of communications of a wireless communications network, and enhance overall network efficiency and latency.

Figure 6:
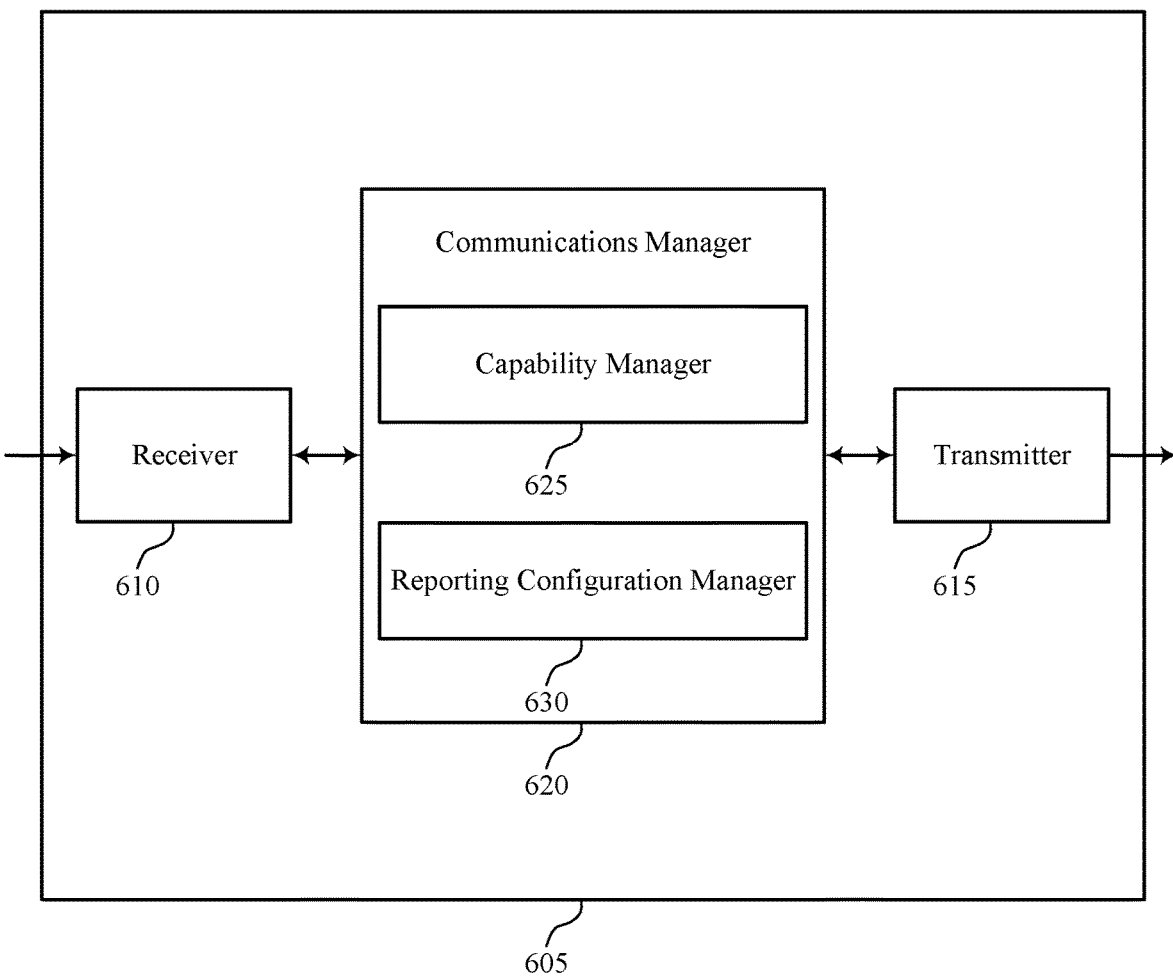
Figure 6:

FIG. 6 shows a block diagram 600 of a device 605 that supports parameter reporting techniques for reduced capability user equipment in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to parameter reporting techniques for reduced capability user equipment). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to parameter reporting techniques for reduced capability user equipment). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of parameter reporting techniques for reduced capability user equipment as described herein. For example, the communications manager 620 may include a capability manager 625 a reporting configuration manager 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The capability manager 625 may be configured as or otherwise support a means for transmitting, to a base station, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters. The reporting configuration manager 630 may be configured as or otherwise support a means for receiving, responsive to the transmitted set of capabilities, an indication from the base station of a reporting configuration for UE-based performance measurement parameter reporting or self-organizing network parameter reporting.

Figure 7:
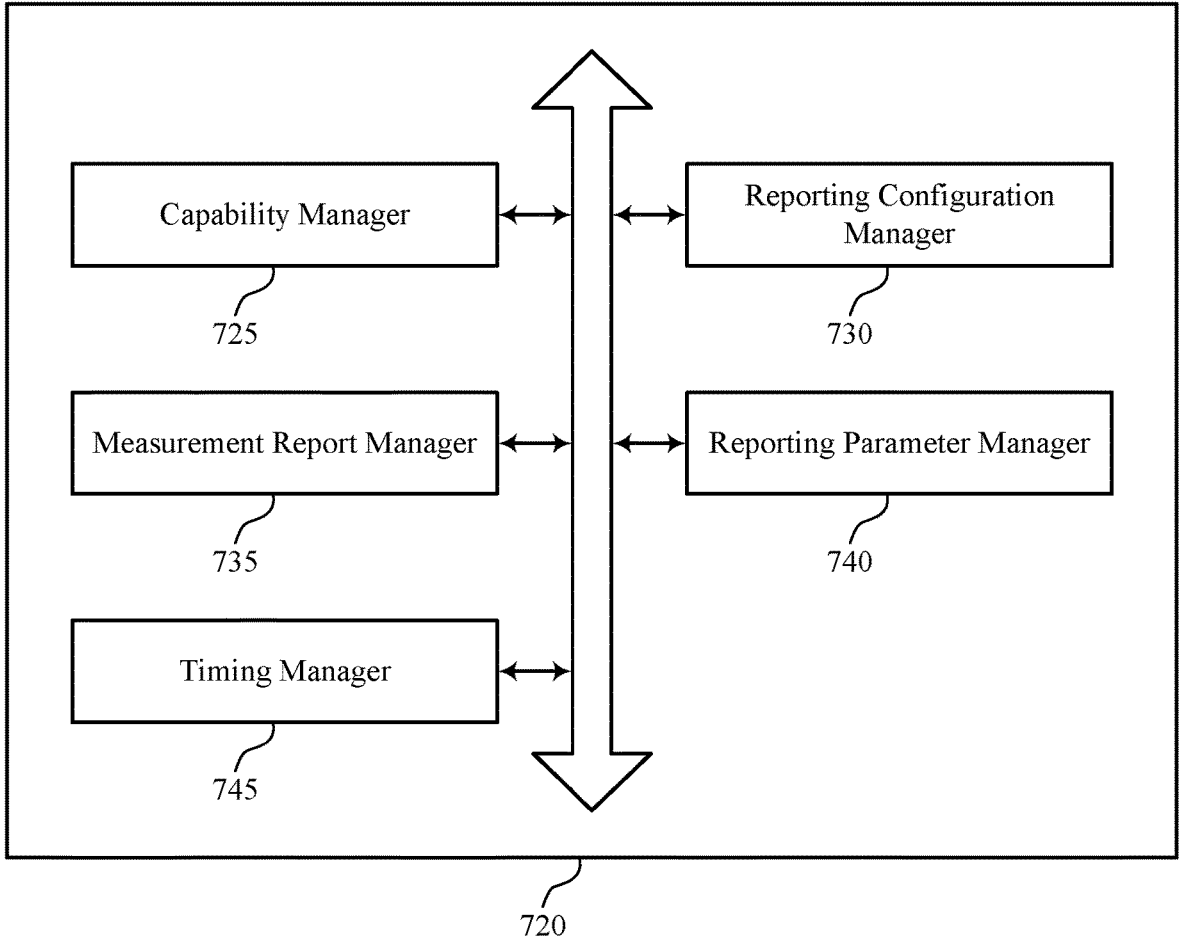
FIG. 7 shows a block diagram of a communications manager that supports parameter reporting techniques for reduced capability user equipment in accordance with aspects of the present disclosure.

FIG. 7 shows a block diagram 700 of a communications manager 720 that supports parameter reporting techniques for reduced capability user equipment in accordance with aspects of the present disclosure. The communications manager 720 may be an example of aspects of a communications manager 520, a communications manager 620, or both, as described herein. The communications manager 720, or various components thereof, may be an example of means for performing various aspects of parameter reporting techniques for reduced capability user equipment as described herein. For example, the communications manager 720 may include a capability manager 725, a reporting configuration manager 730, a measurement report manager 735, a reporting parameter manager 740, a timing manager 745, or any combination thereof. Each of these components may communicate, directly or indirectly, with one another (e.g., via one or more buses).

The communications manager 720 may support wireless communication at a UE in accordance with examples as disclosed herein. The capability manager 725 may be configured as or otherwise support a means for transmitting, to a base station, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters. The reporting configuration manager 730 may be configured as or otherwise support a means for receiving, responsive to the transmitted set of capabilities, an indication from the base station of a reporting configuration for UE-based performance measurement parameter reporting or self-organizing network parameter reporting.

In some examples, the measurement report manager 735 may be configured as or otherwise support a means for receiving, from the base station, a request for a first measurement report that includes one or more UE-based performance measurement parameters, one or more self-organizing network parameters, or any combinations thereof, where the request is responsive to the set of capabilities of the UE. In some examples, the measurement report manager 735 may be configured as or otherwise support a means for transmitting, to the base station, the first measurement report based on one or more measurements of the UE that are obtained in accordance with the set of capabilities of the UE.

In some examples, the set of capabilities of the UE include one or more of an explicit UE capability for transmitting a RLF report, a CEF report, a mobility history report (MHR), a cross-radio access technology (cross-RAT) RLF report, an RLF report for inter-RAT MRO, or any combinations thereof. In some examples, the set of capabilities of the UE include a separate capability indication that the UE lacks support for SON or MDT parameter reporting. In some examples, the set of capabilities of the UE indicate that the UE is a reduced capability (redcap) UE, and indicate that the base station is to request only a supported SON report or MDT report that is based on the set of capabilities of the UE.

In some examples, the one or more capabilities indicate a number of parameters that the UE has a capability to report in a UE-based performance measurement parameter report or a self-organizing network parameter report. In some examples, the number of parameters that the UE has the capability to report is indicated by a scaling factor relative to an unscaled number of parameters that are reported by non-reduced capability devices. In some examples, the number of parameters that the UE has the capability to report includes a number of neighboring cell measurements that are storable at the UE for a logged MDT procedure. In some examples, the number of parameters that the UE has the capability to report includes a number of RACH procedure parameters that are included in a RACH report. In some examples, the number of parameters that the UE has the capability to report is indicated by a memory size of the UE for storing logged MDT measurements.

In some examples, the UE is a reduced capability device and the reporting configuration includes a maximum value of a measurement logging interval that is based on a DRX cycle time of the UE and a logging duration of the UE, and where the DRX cycle time and the logging duration are increased relative to a non-reduced capability device. In some examples, the reporting configuration includes a report storage duration that is based on the UE being a reduced capability device. In some examples, the reporting configuration includes one or more event triggers for measuring and storing one or more measurement parameters, the one or more event triggers based on the UE being a reduced capability device.

Figure 8:
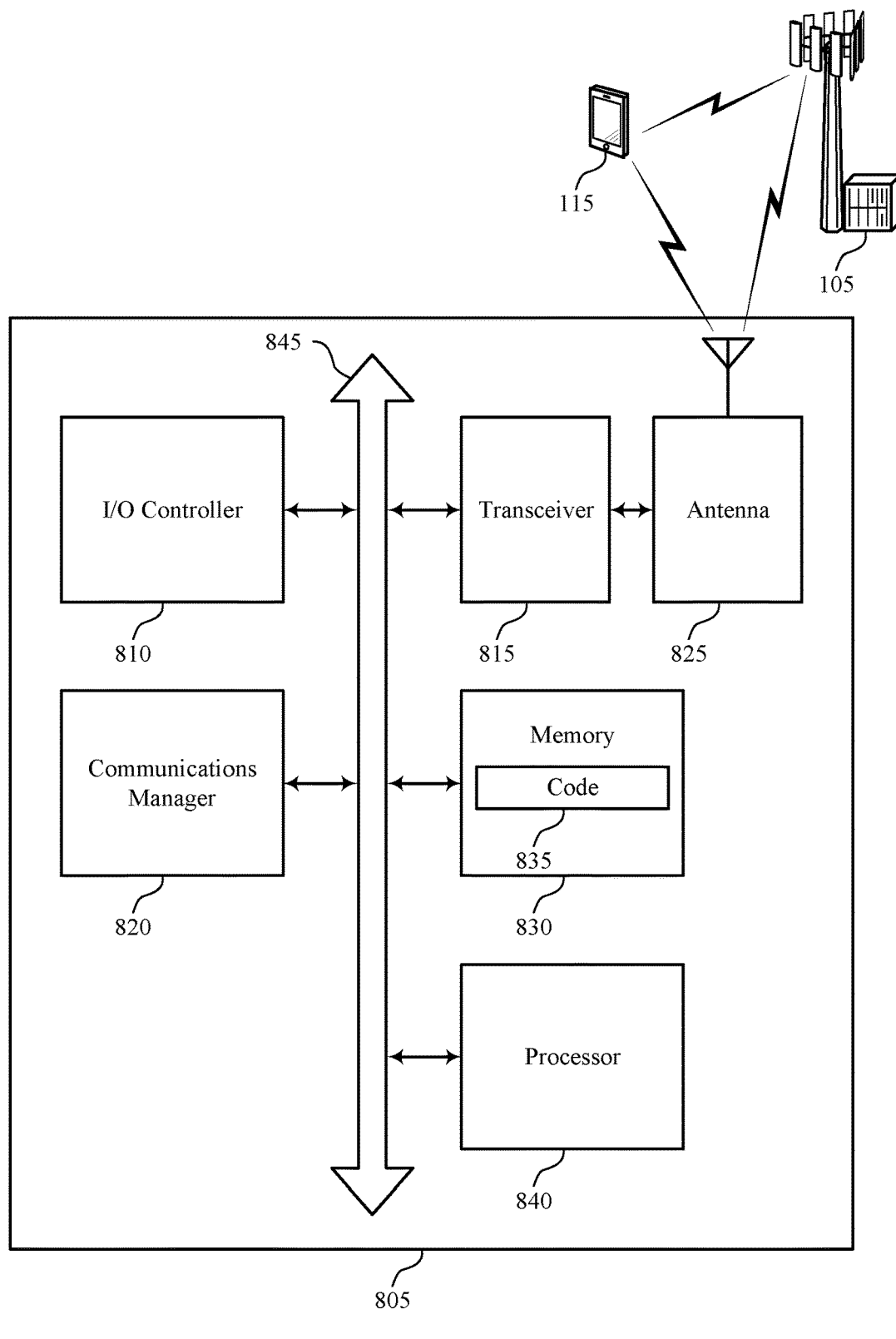
FIG. 8 shows a diagram of a system including a device that supports parameter reporting techniques for reduced capability user equipment in accordance with aspects of the present disclosure.

FIG. 8 shows a diagram of a system 800 including a device 805 that supports parameter reporting techniques for reduced capability user equipment in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting parameter reporting techniques for reduced capability user equipment). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for transmitting, to a base station, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters. The communications manager 820 may be configured as or otherwise support a means for receiving, responsive to the transmitted set of capabilities, an indication from the base station of a reporting configuration for UE-based performance measurement parameter reporting or self-organizing network parameter reporting.

By including or configuring the communications manager 820 in accordance with examples as described herein, the device 805 may support techniques for collection and reporting of SON/MDT data from reduced capability devices to improve the reliability of communications of a wireless communications network, and enhance overall network efficiency and latency, while providing for reduced hardware complexity and processing requirements at the device 805.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of parameter reporting techniques for reduced capability user equipment as described herein, or the processor 840 and the memory 830 may be otherwise configured to perform or support such operations.

Figure 9:
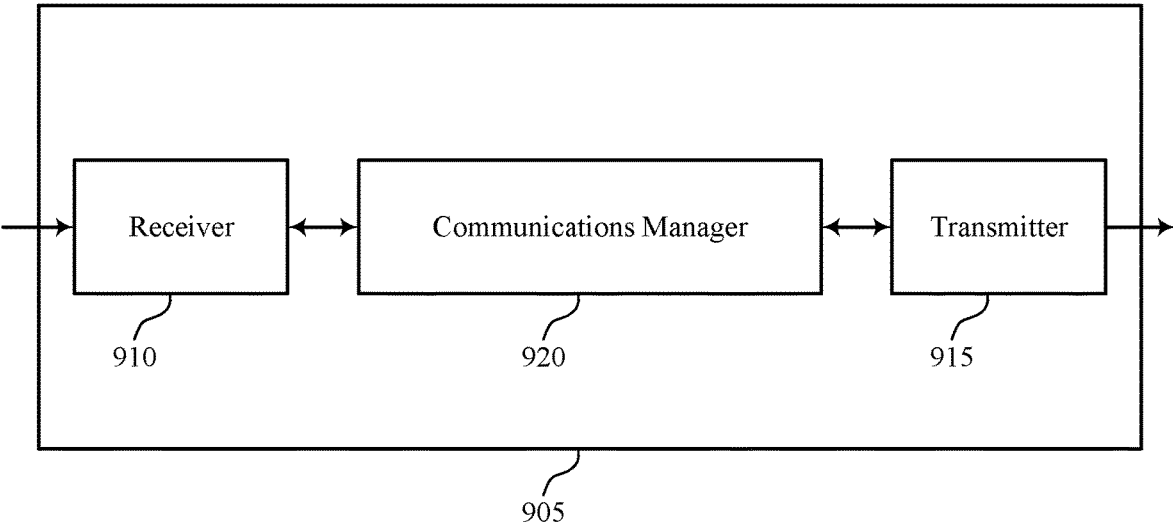
FIGS. 9 and 10 show block diagrams of devices that support parameter reporting techniques for reduced capability user equipment in accordance with aspects of the present disclosure.

FIG. 9 shows a block diagram 900 of a device 905 that supports parameter reporting techniques for reduced capability user equipment in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to parameter reporting techniques for reduced capability user equipment). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to parameter reporting techniques for reduced capability user equipment). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of parameter reporting techniques for reduced capability user equipment as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software) executed by a processor. If implemented in code executed by a processor, the functions of the communications manager 920, the receiver 910, the transmitter 915, or various combinations or components thereof may be performed by a general-purpose processor, a DSP, a CPU, a GPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for receiving, from a UE, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters. The communications manager 920 may be configured as or otherwise support a means for determining a reporting configuration for the UE based on the set of capabilities. The communications manager 920 may be configured as or otherwise support a means for transmitting the reporting configuration to the UE.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for collection and reporting of SON/MDT data from reduced capability devices to improve the reliability of communications of a wireless communications network, and enhance overall network efficiency and latency.

Figure 10:
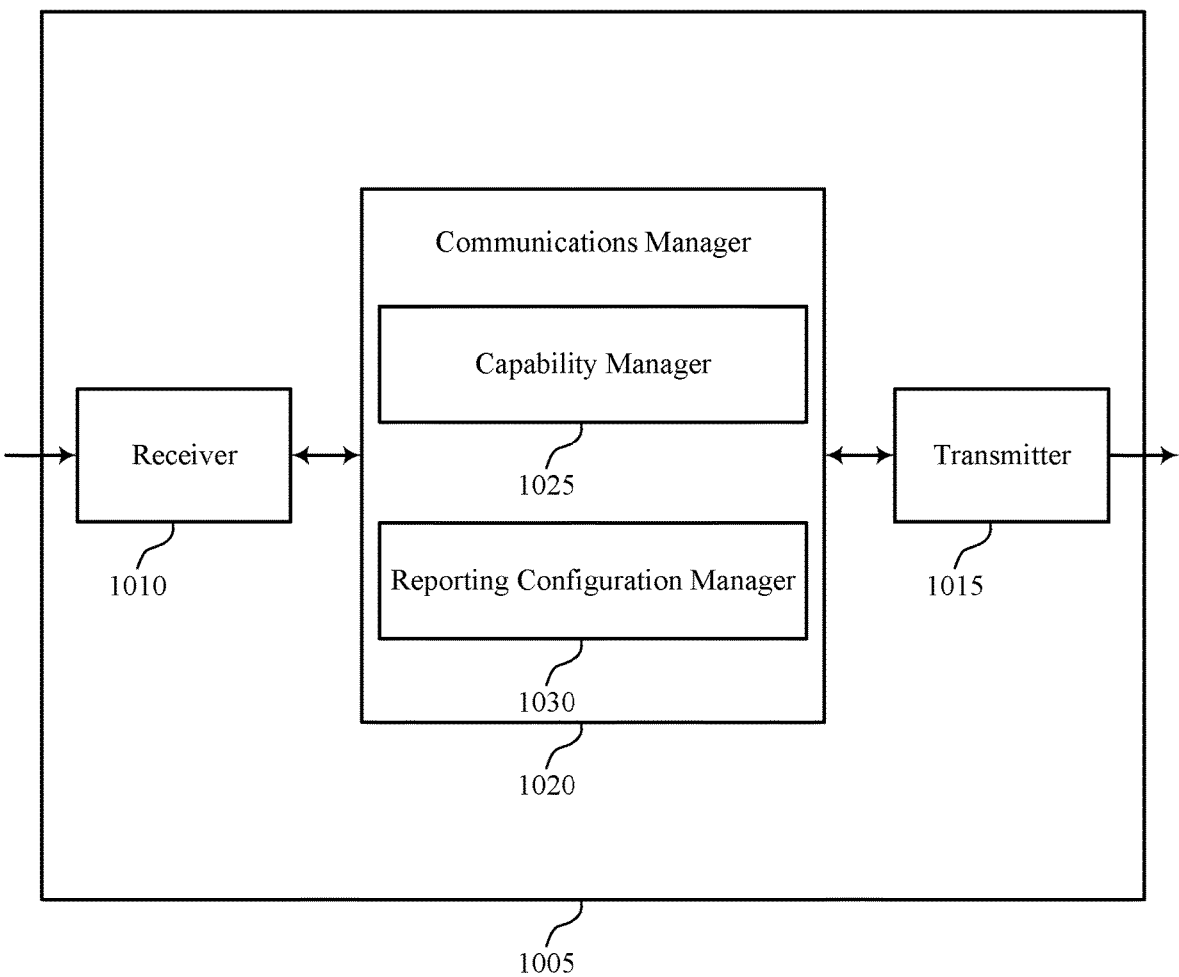

FIG. 10 shows a block diagram 1000 of a device 1005 that supports parameter reporting techniques for reduced capability user equipment in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to parameter reporting techniques for reduced capability user equipment). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to parameter reporting techniques for reduced capability user equipment). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of parameter reporting techniques for reduced capability user equipment as described herein. For example, the communications manager 1020 may include a capability manager 1025 a reporting configuration manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The capability manager 1025 may be configured as or otherwise support a means for receiving, from a UE, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters. The reporting configuration manager 1030 may be configured as or otherwise support a means for determining a reporting configuration for the UE based on the set of capabilities. The reporting configuration manager 1030 may be configured as or otherwise support a means for transmitting the reporting configuration to the UE.

Figure 11:
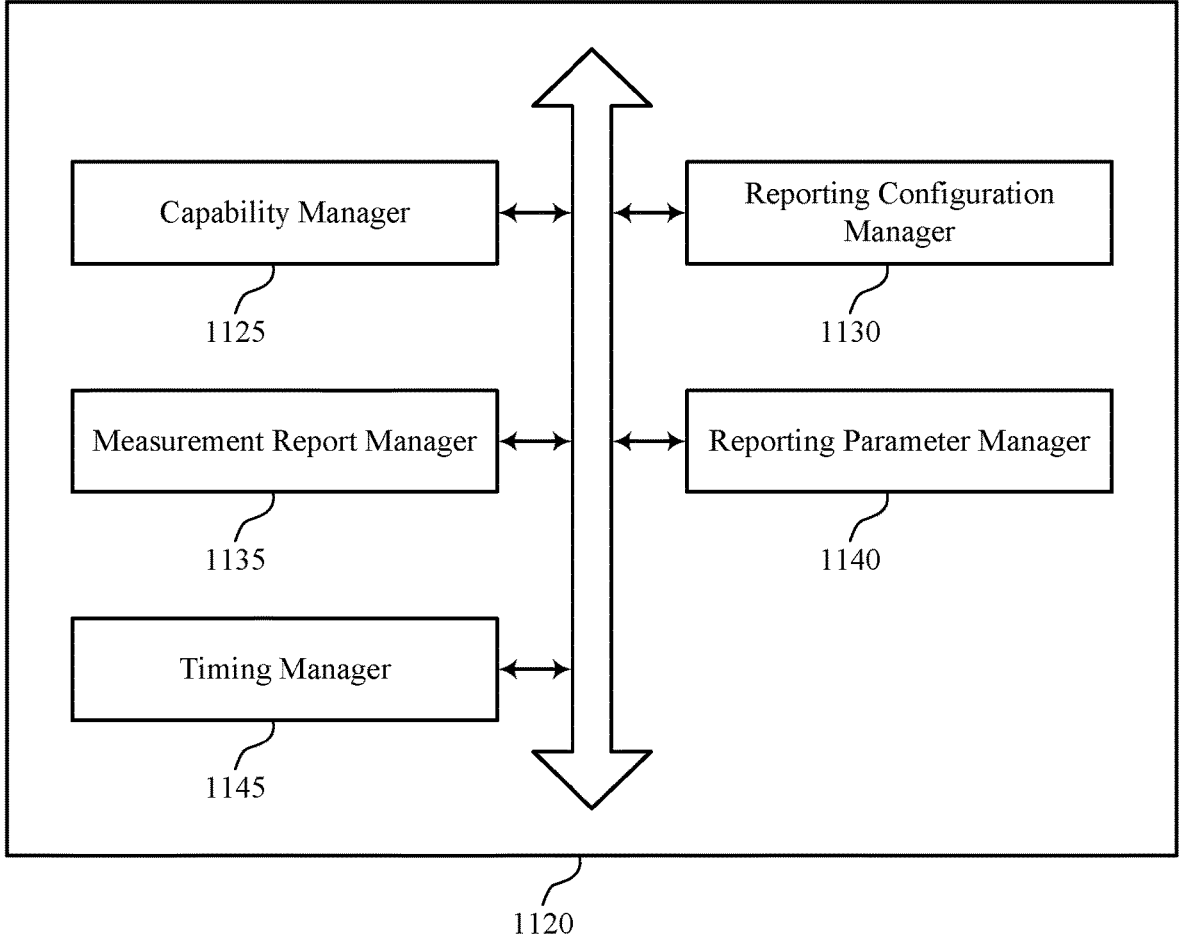
FIG. 11 shows a block diagram of a communications manager that supports parameter reporting techniques for reduced capability user equipment in accordance with aspects of the present disclosure.

FIG. 11 shows a block diagram 1100 of a communications manager 1120 that supports parameter reporting techniques for reduced capability user equipment in accordance with aspects of the present disclosure. The communications manager 1120 may be an example of aspects of a communications manager 920, a communications manager 1020, or both, as described herein. The communications manager 1120, or various components thereof, may be an example of means for performing various aspects of parameter reporting techniques for reduced capability user equipment as described herein. For example, the communications manager 1120 may include a capability manager 1125, a reporting configuration manager 1130, a measurement report manager 1135, a reporting parameter manager 1140, a timing manager 1145, or any combination thereof. Each of these components may communicate, directly or indirectly, with one another (e.g., via one or more buses).

The communications manager 1120 may support wireless communication at a base station in accordance with examples as disclosed herein. The capability manager 1125 may be configured as or otherwise support a means for receiving, from a UE, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters. The reporting configuration manager 1130 may be configured as or otherwise support a means for determining a reporting configuration for the UE based on the set of capabilities. In some examples, the reporting configuration manager 1130 may be configured as or otherwise support a means for transmitting the reporting configuration to the UE.

In some examples, the measurement report manager 1135 may be configured as or otherwise support a means for transmitting, to the UE, a request for a first measurement report that includes one or more UE-based performance measurement parameters, one or more self-organizing network parameters, or any combinations thereof, where the request is based on the set of capabilities of the UE. In some examples, the measurement report manager 1135 may be configured as or otherwise support a means for receiving, from the UE, the first measurement report based on one or more measurements of the UE that are obtained in accordance with the set of capabilities of the UE.

In some examples, the set of capabilities of the UE include one or more of an explicit UE capability for transmitting a RLF report, a CEF report, a MHR, a cross-RAT RLF report, an RLF report for inter-RAT MRO, or any combinations thereof. In some examples, the set of capabilities of the UE include a separate capability indication that the UE lacks support for SON or MDT parameter reporting. In some examples, the set of capabilities of the UE indicate that the UE is a reduced capability (redcap) UE, and indicate that the base station is to request only a supported SON report or MDT report that is based on the set of capabilities of the UE.

In some examples, the one or more capabilities indicate a number of parameters that the UE has a capability to report in a UE-based performance measurement parameter report or a self-organizing network parameter report. In some examples, the number of parameters that the UE has the capability to report is indicated by a scaling factor relative to an unscaled number of parameters that are reported by a non-reduced capability device. In some examples, the UE is a reduced capability device and the reporting configuration includes a maximum value of a measurement logging interval that is based on a DRX cycle time of the UE and a logging duration of the UE, and where the DRX cycle time and the logging duration are increased relative to a non-reduced capability device.

FIG. 12 shows a diagram of a system 1200 including a device 1205 that supports parameter reporting techniques for reduced capability user equipment in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting parameter reporting techniques for reduced capability user equipment). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for receiving, from a UE, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters. The communications manager 1220 may be configured as or otherwise support a means for determining a reporting configuration for the UE based on the set of capabilities. The communications manager 1220 may be configured as or otherwise support a means for transmitting the reporting configuration to the UE.

By including or configuring the communications manager 1220 in accordance with examples as described herein, the device 1205 may support techniques for collection and reporting of SON/MDT data from reduced capability devices to improve the reliability of communications of a wireless communications network, and enhance overall network efficiency and latency.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of parameter reporting techniques for reduced capability user equipment as described herein, or the processor 1240 and the memory 1230 may be otherwise configured to perform or support such operations.

FIG. 13 shows a flowchart illustrating a method 1300 that supports parameter reporting techniques for reduced capability user equipment in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters. The operations of 1305 may be performed in accordance with examples as disclosed herein. In some examples, aspects of the operations of 1305 may be performed by a capability manager 725 as described with reference to FIG. 7.

At 1310, the method may include receiving, responsive to the transmitted set of capabilities, an indication from the base station of a reporting configuration for UE-based performance measurement parameter reporting or self-organizing network parameter reporting. The operations of 1310 may be performed in accordance with examples as disclosed herein. In some examples, aspects of the operations of 1310 may be performed by a reporting configuration manager 730 as described with reference to FIG. 7.

FIG. 14 shows a flowchart illustrating a method 1400 that supports parameter reporting techniques for reduced capability user equipment in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters. The operations of 1405 may be performed in accordance with examples as disclosed herein. In some examples, aspects of the operations of 1405 may be performed by a capability manager 725 as described with reference to FIG. 7.

At 1410, the method may include receiving, responsive to the transmitted set of capabilities, an indication from the base station of a reporting configuration for UE-based performance measurement parameter reporting or self-organizing network parameter reporting. The operations of 1410 may be performed in accordance with examples as disclosed herein. In some examples, aspects of the operations of 1410 may be performed by a reporting configuration manager 730 as described with reference to FIG. 7.

At 1415, the method may include receiving, from the base station, a request for a first measurement report that includes one or more UE-based performance measurement parameters, one or more self-organizing network parameters, or any combinations thereof, where the request is responsive to the set of capabilities of the UE. The operations of 1415 may be performed in accordance with examples as disclosed herein. In some examples, aspects of the operations of 1415 may be performed by a measurement report manager 735 as described with reference to FIG. 7.

At 1420, the method may include transmitting, to the base station, the first measurement report based at least in part on one or more measurements of the UE that are obtained in accordance with the set of capabilities of the UE. The operations of 1420 may be performed in accordance with examples as disclosed herein. In some examples, aspects of the operations of 1420 may be performed by a measurement report manager 735 as described with reference to FIG. 7.

FIG. 15 shows a flowchart illustrating a method 1500 that supports parameter reporting techniques for reduced capability user equipment in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include receiving, from a UE, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters. The operations of 1505 may be performed in accordance with examples as disclosed herein. In some examples, aspects of the operations of 1505 may be performed by a capability manager 1125 as described with reference to FIG. 11.

At 1510, the method may include determining a reporting configuration for the UE based at least in part on the set of capabilities. The operations of 1510 may be performed in accordance with examples as disclosed herein. In some examples, aspects of the operations of 1510 may be performed by a reporting configuration manager 1130 as described with reference to FIG. 11.

At 1515, the method may include transmitting the reporting configuration to the UE. The operations of 1515 may be performed in accordance with examples as disclosed herein. In some examples, aspects of the operations of 1515 may be performed by a reporting configuration manager 1130 as described with reference to FIG. 11.

FIG. 16 shows a flowchart illustrating a method 1600 that supports parameter reporting techniques for reduced capability user equipment in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, a set of capabilities of the UE for UE-based performance measurement parameter reporting or self-organizing network parameter reporting, where one or more capabilities of the set of capabilities indicate that the UE has a capability that is below a threshold capability value for one or more UE-based performance measurement parameters or self-organizing network parameters. The operations of 1605 may be performed in accordance with examples as disclosed herein. In some examples, aspects of the operations of 1605 may be performed by a capability manager 1125 as described with reference to FIG. 11.

At 1610, the method may include determining a reporting configuration for the UE based at least in part on the set of capabilities. The operations of 1610 may be performed in accordance with examples as disclosed herein. In some examples, aspects of the operations of 1610 may be performed by a reporting configuration manager 1130 as described with reference to FIG. 11.

At 1615, the method may include transmitting the reporting configuration to the UE. The operations of 1615 may be performed in accordance with examples as disclosed herein. In some examples, aspects of the operations of 1615 may be performed by a reporting configuration manager 1130 as described with reference to FIG. 11.

At 1620, the method may include transmitting, to the UE, a request for a first measurement report that includes one or more UE-based performance measurement parameters, one or more self-organizing network parameters, or any combinations thereof, where the request is based at least in part on the set of capabilities of the UE. The operations of 1620 may be performed in accordance with examples as disclosed herein. In some examples, aspects of the operations of 1620 may be performed by a measurement report manager 1135 as described with reference to FIG. 11.

At 1625, the method may include receiving, from the UE, the first measurement report based at least in part on one or more measurements of the UE that are obtained in accordance with the set of capabilities of the UE. The operations of 1625 may be performed in accordance with examples as disclosed herein. In some examples, aspects of the operations of 1625 may be performed by a measurement report manager 1135 as described with reference to FIG. 11.

The following provides an overview of aspects of the present disclosure:

Aspect 1: A method for wireless communication at a UE, comprising: transmitting, to a base station, a set of capabilities of the UE for UE-based performance measurement parameter reporting or self-organizing network parameter reporting, wherein one or more capabilities of the set of capabilities indicate that the UE has a capability that is below a threshold capability value for one or more UE-based performance measurement parameters or self-organizing network parameters; and receiving, responsive to the transmitted set of capabilities, an indication from the base station of a reporting configuration for the UE-based performance measurement parameter reporting or the self-organizing network parameter reporting.

Aspect 2: The method of aspect 1, further comprising: receiving, from the base station, a request for a first measurement report that includes the one or more UE-based performance measurement parameters, the one or more self-organizing network parameters, or any combinations thereof, wherein the request is responsive to the set of capabilities of the UE; and transmitting, to the base station, the first measurement report based at least in part on one or more measurements of the UE that are obtained in accordance with the set of capabilities of the UE.

Aspect 3: The method of any of aspects 1 through 2, wherein the set of capabilities of the UE include one or more of an explicit UE capability for transmitting a radio link failure (RLF) report, a connection establishment failure (CEF) report, a mobility history report (MHR), a cross-radio access technology (cross-RAT) RLF report, an RLF report for inter-RAT mobility robustness optimization (MRO), or any combinations thereof.

Aspect 4: The method of any of aspects 1 through 3, wherein the set of capabilities of the UE include a separate capability indication that the UE lacks support for self-organizing network (SON) or minimization of drive tests (MDT) parameter reporting.

Aspect 5: The method of any of aspects 1 through 4, wherein the set of capabilities of the UE indicate that the UE is a reduced capability (redcap) UE, and indicate that the base station is to request only a supported self-organizing network (SON) report or minimization of drive tests (MDT) report that is based at least in part on the set of capabilities of the UE.

Aspect 6: The method of any of aspects 1 through 5, wherein the one or more capabilities indicate a number of parameters that the UE has a capability to report in a UE-based performance measurement parameter report or a self-organizing network parameter report.

Aspect 7: The method of aspect 6, wherein the number of parameters that the UE has the capability to report is indicated by a scaling factor relative to an unscaled number of parameters that are reported by non-reduced capability devices.

Aspect 8: The method of any of aspects 6 through 7, wherein the number of parameters that the UE has the capability to report includes a number of neighboring cell measurements that are storable at the UE for a logged minimization of drive tests (MDT) procedure.

Aspect 9: The method of any of aspects 6 through 8, wherein the number of parameters that the UE has the capability to report includes a number of RACH procedure parameters that are included in a RACH report.

Aspect 10: The method of any of aspects 6 through 9, wherein the number of parameters that the UE has the capability to report is indicated by a memory size of the UE for storing logged minimization of drive tests (MDT) measurements.

Aspect 11: The method of any of aspects 1 through 10, wherein the UE is a reduced capability device and the reporting configuration includes a maximum value of a measurement logging interval that is based at least in part on a DRX cycle time of the UE and a logging duration of the UE, and the DRX cycle time and the logging duration are increased relative to a non-reduced capability device.

Aspect 12: The method of any of aspects 1 through 11, wherein the reporting configuration includes a report storage duration that is based at least in part on the UE being a reduced capability device.

Aspect 13: The method of any of aspects 1 through 12, wherein the reporting configuration includes one or more event triggers for measuring and storing one or more measurement parameters, the one or more event triggers based at least in part on the UE being a reduced capability device.

Aspect 14: A method for wireless communication at a base station, comprising: receiving, from a UE, a set of capabilities of the UE for UE-based performance measurement parameter reporting or self-organizing network parameter reporting, wherein one or more capabilities of the set of capabilities indicate that the UE has a capability that is below a threshold capability value for one or more UE-based performance measurement parameters or self-organizing network parameters; determining a reporting configuration for the UE based at least in part on the set of capabilities; and transmitting the reporting configuration to the UE.

Aspect 15: The method of aspect 14, further comprising: transmitting, to the UE, a request for a first measurement report that includes the one or more UE-based performance measurement parameters, the one or more self-organizing network parameters, or any combinations thereof, wherein the request is based at least in part on the set of capabilities of the UE; and receiving, from the UE, the first measurement report based at least in part on one or more measurements of the UE that are obtained in accordance with the set of capabilities of the UE.

Aspect 16: The method of any of aspects 14 through 15, wherein the set of capabilities of the UE include one or more of an explicit UE capability for transmitting a radio link failure (RLF) report, a connection establishment failure (CEF) report, a mobility history report (MHR), a cross-radio access technology (cross-RAT) RLF report, an RLF report for inter-RAT mobility robustness optimization (MRO), or any combinations thereof.

Aspect 17: The method of any of aspects 14 through 16, wherein the set of capabilities of the UE include a separate capability indication that the UE lacks support for self-organizing network (SON) or minimization of drive tests (MDT) parameter reporting.

Aspect 18: The method of any of aspects 14 through 17, wherein the set of capabilities of the UE indicate that the UE is a reduced capability (redcap) UE, and indicate that the base station is to request only a supported self-organizing network (SON) report or minimization of drive tests (MDT) report that is based at least in part on the set of capabilities of the UE.

Aspect 19: The method of any of aspects 14 through 18, wherein the one or more capabilities indicate a number of parameters that the UE has a capability to report in a UE-based performance measurement parameter report or a self-organizing network parameter report.

Aspect 20: The method of aspect 19, wherein the number of parameters that the UE has the capability to report is indicated by a scaling factor relative to an unscaled number of parameters that are reported by a non-reduced capability device.

Aspect 21: The method of any of aspects 14 through 20, wherein the UE is a reduced capability device and the reporting configuration includes a maximum value of a measurement logging interval that is based at least in part on a DRX cycle time of the UE and a logging duration of the UE, and the DRX cycle time and the logging duration are increased relative to a non-reduced capability device.

Aspect 22: An apparatus for wireless communication at a UE, comprising at least one processor; and memory coupled with the at least one processor, the memory storing instructions executable by the at least one processor to cause the UE to perform a method of any of aspects 1 through 13.

Aspect 23: An apparatus for wireless communication at a UE, comprising at least one means for performing a method of any of aspects 1 through 13.

Aspect 24: A non-transitory computer-readable medium storing code for wireless communication at a UE, the code comprising instructions executable by at least one processor to perform a method of any of aspects 1 through 13.

Aspect 25: An apparatus for wireless communication at a base station, comprising at least one processor; and memory coupled with the at least one processor, the memory storing instructions executable by the at least one processor to cause the base station to perform a method of any of aspects 14 through 21.

Aspect 26: An apparatus for wireless communication at a base station, comprising at least one means for performing a method of any of aspects 14 through 21.

Aspect 27: A non-transitory computer-readable medium storing code for wireless communication at a base station, the code comprising instructions executable by at least one processor to perform a method of any of aspects 14 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), or ascertaining. Also, "determining" can include receiving (such as receiving information), or accessing (such as accessing data in a memory). Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a reduced capability (RedCap) user equipment (UE), comprising:
transmitting capability signaling indicative of a set of capabilities of the RedCap UE for UE-based performance measurement parameter reporting or self-organizing network (SON) parameter reporting, wherein a capability of the set of capabilities indicates whether the RedCap UE supports minimization of drive tests (MDT) parameter reporting; and
receiving, responsive to the capability signaling, an indication of a reporting configuration for reporting one or more UE-based performance measurement parameters or one or more SON parameters, wherein the reporting configuration is in accordance with whether the RedCap UE supports the MDT parameter reporting.

2. The method of claim 1, further comprising:
receiving a request for a first measurement report that includes the one or more UE-based performance measurement parameters, one or more SON parameters, or any combinations thereof, wherein the request is responsive to the set of capabilities of the RedCap UE; and
transmitting the first measurement report based at least in part on one or more measurements of the RedCap UE that are obtained in accordance with the set of capabilities of the RedCap UE.

3. The method of claim 1, wherein the set of capabilities of the RedCap UE include one or more of an explicit UE capability for transmitting a radio link failure (RLF) report, a connection establishment failure (CEF) report, a mobility history report (MHR), a cross-radio access technology (cross-RAT) RLF report, an RLF report for inter-RAT mobility robustness optimization (MRO), or any combinations thereof.

4. The method of claim 1, wherein the capability indicates that the UE lacks support for the SON or the MDT parameter reporting.

5. The method of claim 1, wherein the set of capabilities of the RedCap UE indicate that the UE is a RedCap UE, and indicate that a network entity is to request only a supported SON report or MDT report that is based at least in part on the set of capabilities of the UE.

6. The method of claim 1, wherein a second capability of the set of capabilities of the RedCap UE indicates a first quantity of measurement parameters that the RedCap UE is capable of reporting in a UE-based performance measurement parameter report or a SON parameter report.

7. The method of claim 6, wherein the first quantity of measurement parameters is indicated by a scaling factor relative to a threshold quantity of measurement parameters that are reported by non-reduced capability devices.

8. The method of claim 6, wherein the first quantity of measurement parameters includes a quantity of neighboring cell measurements that are storable at the UE for a logged MDT procedure.

9. The method of claim 6, wherein the first quantity of measurement parameters includes a quantity of random access channel (RACH) procedure parameters that are included in a RACH report.

10. The method of claim 6, wherein the first quantity of measurement parameters is indicated by a memory size of the RedCap UE for storing logged MDT measurements.

11. The method of claim 1, wherein the reporting configuration includes a maximum value of a measurement logging interval that is based at least in part on a discontinuous reception (DRX) cycle time of the RedCap UE and a logging duration of the RedCap UE, and wherein the DRX cycle time and the logging duration are increased relative to a non-reduced capability device.

12. The method of claim 1, wherein the reporting configuration includes a report storage duration that is based at least in part on the RedCap UE being a reduced capability device.

13. The method of claim 1, wherein the reporting configuration includes one or more event triggers for measuring and storing one or more measurement parameters, the one or more event triggers based at least in part on the RedCap UE being a reduced capability device.

14. A method for wireless communication at a network entity, comprising:

receiving, from a reduced capability (RedCap) user equipment (UE), capability signaling indicative of a set of capabilities of the RedCap UE for UE-based performance measurement parameter reporting or self-organizing network (SON) parameter reporting, wherein a capability of the set of capabilities indicates whether the RedCap UE supports minimization of drive tests (MDT) parameter reporting; and transmitting, to the RedCap UE and responsive to the capability signaling, an indication of a reporting configuration for the RedCap UE, wherein the reporting configuration is in accordance with whether the RedCap UE supports the MDT parameter reporting.

15. The method of claim 14, further comprising:

transmitting, to the RedCap UE, a request for a first measurement report that includes one or more UE-based performance measurement parameters, one or more SON parameters, or any combinations thereof, wherein the request is based at least in part on the set of capabilities of the RedCap UE; and receiving, from the RedCap UE, the first measurement report based at least in part on one or more measurements of the RedCap UE that are obtained in accordance with the set of capabilities of the RedCap UE.

16. The method of claim 14, wherein the set of capabilities of the RedCap UE include one or more of an explicit UE capability for transmitting a radio link failure (RLF) report, a connection establishment failure (CEF) report, a mobility history report (MHR), a cross-radio access technology (cross-RAT) RLF report, an RLF report for inter-RAT mobility robustness optimization (MRO), or any combinations thereof.

17. The method of claim 14, wherein the capability indicates that the RedCap UE lacks support for the SON or the MDT parameter reporting.

18. The method of claim 14, wherein the set of capabilities of the RedCap UE indicate that the UE is a RedCap UE, and indicate that the network entity is to request only a supported SON report or MDT report that is based at least in part on the set of capabilities of the UE.

19. The method of claim 14, wherein a second capability of the set of capabilities of the RedCap UE indicate a first quantity of measurement parameters that the RedCap UE is capable of reporting in a UE-based performance measurement parameter report or a SON parameter report.

20. The method of claim 19, wherein the first quantity of measurement parameters is indicated by a scaling factor relative to a threshold quantity of measurement parameters that are reported by non-reduced capability devices.

21. The method of claim 14, wherein the reporting configuration includes a maximum value of a measurement logging interval that is based at least in part on a discontinuous reception (DRX) cycle time of the RedCap UE and a logging duration of the RedCap UE, and wherein the DRX cycle time and the logging duration are increased relative to a non-reduced capability device.

22. A reduced capability (RedCap) user equipment (UE) for wireless communication, comprising:

one or more memories storing processor-executable code; and one or more processors coupled with the one or more memories and individually or collectively operable to execute the code to cause the RedCap UE to:

transmit capability signaling indicative of a set of capabilities of the RedCap UE for UE-based performance measurement parameter reporting or self-organizing network (SON) parameter reporting, wherein a capability of the set of capabilities indicates whether the RedCap UE supports minimization of drive tests (MDT) parameter reporting; and receive, responsive to the capability signaling, an indication of a reporting configuration for reporting one or more UE-based performance measurement parameters or one or more SON parameters, wherein the reporting configuration is in accordance with whether the RedCap UE supports the MDT parameter reporting.

23. The RedCap UE of claim 22, wherein the one or more processors are individually or collectively further operable to execute the code to cause the UE to:

receive a request for a first measurement report that includes the one or more UE-based performance measurement parameters, the one or more SON parameters, or any combinations thereof, wherein the request is responsive to the set of capabilities of the RedCap UE; and transmit the first measurement report based at least in part on one or more measurements of the UE that are obtained in accordance with the set of capabilities of the UE.

24. The RedCap UE of claim 22, wherein the set of capabilities of the UE include one or more of an explicit UE capability for transmitting a radio link failure (RLF) report, a connection establishment failure (CEF) report, a mobility history report (MHR), a cross-radio access technology (cross-RAT) RLF report, an RLF report for inter-RAT mobility robustness optimization (MRO), or any combinations thereof.

25. The RedCap UE of claim 22, wherein the capability indicates that the RedCap UE lacks support for the SON or the MDT parameter reporting.

26. The RedCap UE of claim 22, wherein a second capability of the set of capabilities of the RedCap UE indicates a first quantity of measurement parameters that the UE is capable of reporting in a UE-based performance measurement parameter report or a SON parameter report.

27. The RedCap UE of claim 22, wherein the capability signaling comprises an indication of whether the RedCap UE supports each capability of the set of capabilities, and wherein the capability signaling is indicative of the set of capabilities based at least in part on the indication.

28. The RedCap UE of claim 22, wherein the set of capabilities comprises a first capability to transmit a radio link failure (RLF) report, a second capability to transmit a connection establishment failure (CEF) report, or both.

29. The RedCap UE of claim 22, wherein a first quantity of measurement parameters that the RedCap UE is capable of reporting for the MDT parameter reporting is based at least in part on are indicated by a memory size of the UE for storing logged MDT measurements.

30. A network entity for wireless communication, comprising:

one or more memories storing processor-executable code; and one or more processors coupled with the one or more memories and individually or collectively operable to execute the code to cause the network entity to:

receive, from a reduced capability (RedCap) user equipment (UE), capability signaling indicative of a set of capabilities of the RedCap UE for UE-based performance measurement parameter reporting or self-organizing network (SON) parameter reporting, wherein a capability of the set of capabilities indicates whether the RedCap UE supports minimization of drive tests (MDT) parameter reporting; and transmit, to the RedCap UE and responsive to the capability signaling, an indication of a reporting configuration for the RedCap UE, wherein the reporting configuration is in accordance with whether the RedCap UE supports the MDT parameter reporting.

31. The network entity of claim 30, wherein the one or more processors are individually or collectively further operable to execute the code to cause the network entity to:

transmit, to the RedCap UE, a request for a first measurement report that includes one or more UE-based performance measurement parameters, one or more SON parameters, or any combinations thereof, wherein the request is based at least in part on the set of capabilities of the RedCap UE; and receive, from the RedCap UE, the first measurement report based at least in part on one or more measurements of the RedCap UE that are obtained in accordance with the set of capabilities of the RedCap UE.

32. The network entity of claim 30, wherein the set of capabilities of the RedCap UE include one or more of an explicit UE capability for transmitting a radio link failure (RLF) report, a connection establishment failure (CEF) report, a mobility history report (MHR), a cross-radio access technology (cross-RAT) RLF report, an RLF report for inter-RAT mobility robustness optimization (MRO), or any combinations thereof.

33. The network entity of claim 30, wherein a second capability of the set of capabilities of the RedCap UE indicate a first quantity of measurement parameters that the RedCap UE is capable of reporting in a UE-based performance measurement parameter report or a SON parameter report.

* * * * *